（12）United States Patent
Whiting et al.

(10) Patent No.: US 9,366,280 B2
(45) Date of Patent: *Jun. 14, 2016

(54) VEHICLE EXPANSION RETAINER

(71) Applicant: Polaris Industries, Inc., Medina, MN (US)

(72) Inventors: Michael J. Whiting, Roseau, MN (US); Steven C. Erickson, Roseau, MN (US); David Foss, Greenbush, MN (US)

(73) Assignee: Polaris Industries Inc., Medina, MN (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/467,813

(22) Filed: Aug. 25, 2014

(65) Prior Publication Data

US 2014/0363222 A1  Dec. 11, 2014

Related U.S. Application Data

(63) Continuation of application No. 13/619,167, filed on Sep. 14, 2012, now Pat. No. 8,813,673, which is a continuation of application No. 13/041,301, filed on Mar. 4, 2011, now Pat. No. 8,267,034, which is a continuation of application No. 11/716,837, filed on Mar. 12, 2007, now Pat. No. 7,975,640, which is a continuation of application No. 11/356,569, filed on Feb. 17, 2006, now Pat. No. 7,222,582, which is a continuation of application No. 10/889,802, filed on Jul. 13, 2004, now Pat. No. 7,055,454.

(51) Int. Cl.
*B63B 17/00* (2006.01)
*F16B 21/06* (2006.01)
*B62J 9/00* (2006.01)
*B62J 11/00* (2006.01)
*B62K 19/40* (2006.01)

(52) U.S. Cl.
CPC . *F16B 21/06* (2013.01); *B62J 9/00* (2013.01); *B62J 11/00* (2013.01); *B62K 19/40* (2013.01); *Y10T 29/49947* (2015.01); *Y10T 403/595* (2015.01)

(58) Field of Classification Search
CPC .............. F16B 21/06; B62J 9/00; B62J 11/00
USPC ........................................................ 114/364
See application file for complete search history.

(56) References Cited

U.S. PATENT DOCUMENTS

| 408,364 A | 8/1889 | Traut |
| 458,304 A | 8/1891 | Little |
| 875,397 A | 12/1907 | Willis |
| 1,212,871 A | 1/1917 | Abbott |
| 2,321,515 A | 6/1943 | Rice |
| 2,968,205 A | 1/1961 | Springate |
| 3,421,726 A | 1/1969 | Getter |

(Continued)

FOREIGN PATENT DOCUMENTS

EP   0480534 A1   4/1992

OTHER PUBLICATIONS

Southco Product Catalog Online Edition, Southco Pawl/Cam Action Latches pp. 106 [online] [retrieved on Jul. 2, 2004] Retrieved from http://www.southco.com/pdf/2-2-1.pdf.

*Primary Examiner* — Stephen Avila
(74) *Attorney, Agent, or Firm* — Faegre Baker Daniels LLP

(57) ABSTRACT

A method and apparatus for retaining accessories to a vehicle.

28 Claims, 20 Drawing Sheets

(56) References Cited

U.S. PATENT DOCUMENTS

| | | |
|---|---|---|
| 4,027,892 A | 6/1977 | Parks |
| 4,258,947 A | 3/1981 | Thompson et al. |
| 4,469,261 A | 9/1984 | Stapleton et al. |
| 4,657,299 A | 4/1987 | Mahan |
| 4,662,594 A | 5/1987 | Dubis |
| 4,906,148 A | 3/1990 | Schule |
| 4,911,348 A | 3/1990 | Rasor et al. |
| 4,989,532 A | 2/1991 | Kishi et al. |
| 5,273,382 A | 12/1993 | Yearick |
| D352,885 S | 11/1994 | Holtman |
| 5,368,347 A | 11/1994 | Holtman et al. |
| 5,499,595 A | 3/1996 | Pollen |
| 5,590,921 A | 1/1997 | Holtman et al. |
| 5,813,640 A | 9/1998 | Koch et al. |
| 5,915,900 A | 6/1999 | Boltz |
| D413,056 S | 8/1999 | Sokurenko et al. |
| 5,931,516 A | 8/1999 | Holtman et al. |
| 5,978,233 A | 11/1999 | Roscoe et al. |
| 6,053,070 A | 4/2000 | Tieu |
| D456,237 S | 4/2002 | Sokurenko et al. |
| 6,419,104 B1 | 7/2002 | Sarajian |
| 6,520,545 B2 | 2/2003 | Johll, Jr. et al. |
| 6,571,047 B1 | 5/2003 | Yarkosky et al. |
| 6,659,513 B1 | 12/2003 | Ramsauer |
| 6,749,036 B1 | 6/2004 | Schrapp et al. |
| 6,769,849 B2 | 8/2004 | Yoneoka |
| 7,055,454 B1 | 6/2006 | Whiting et al. |
| 7,222,582 B1 | 5/2007 | Whiting et al. |
| 7,975,640 B1 | 7/2011 | Whiting et al. |
| 8,267,034 B2 | 9/2012 | Whiting et al. |
| 2002/0148867 A1 | 10/2002 | Savant |

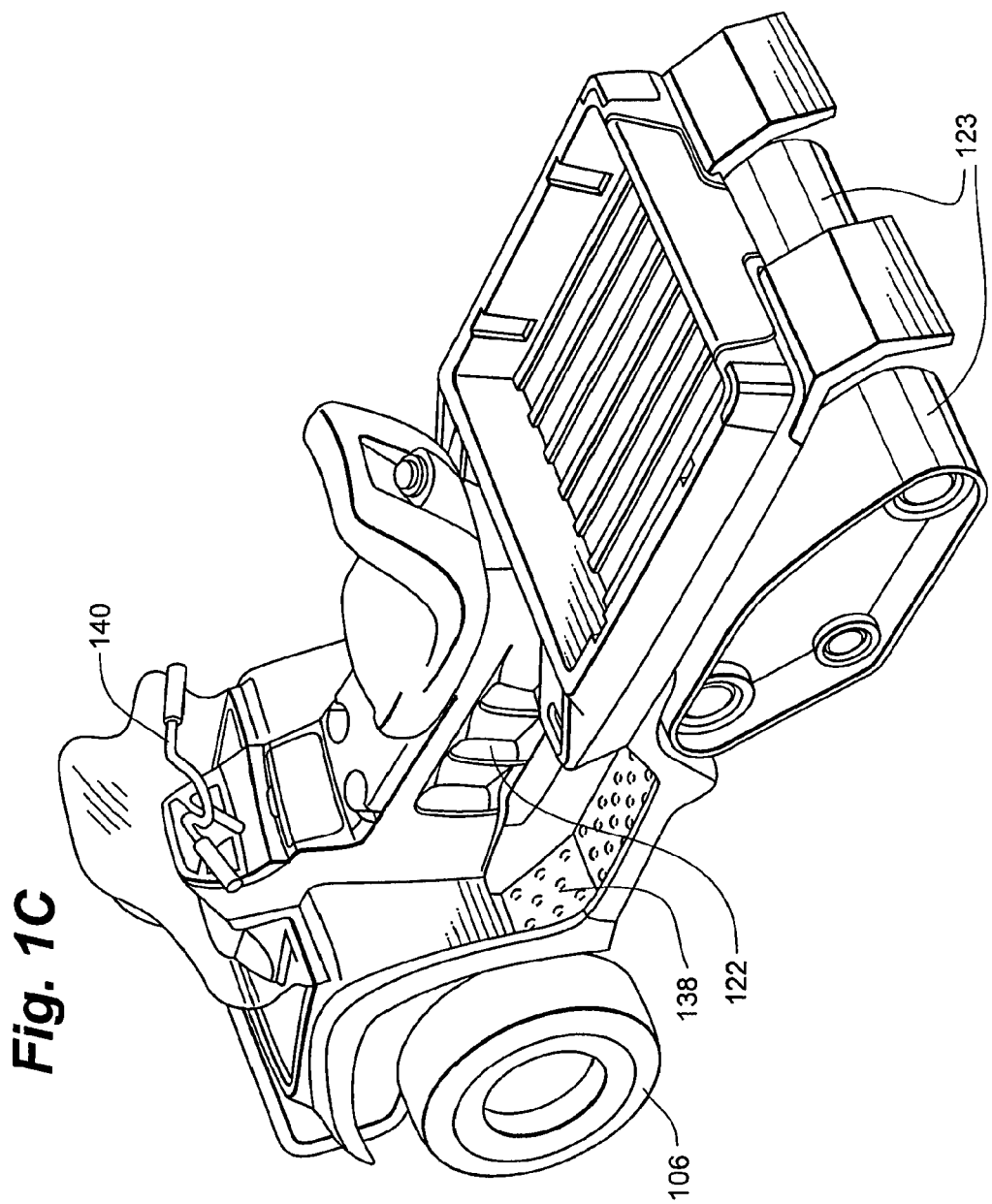

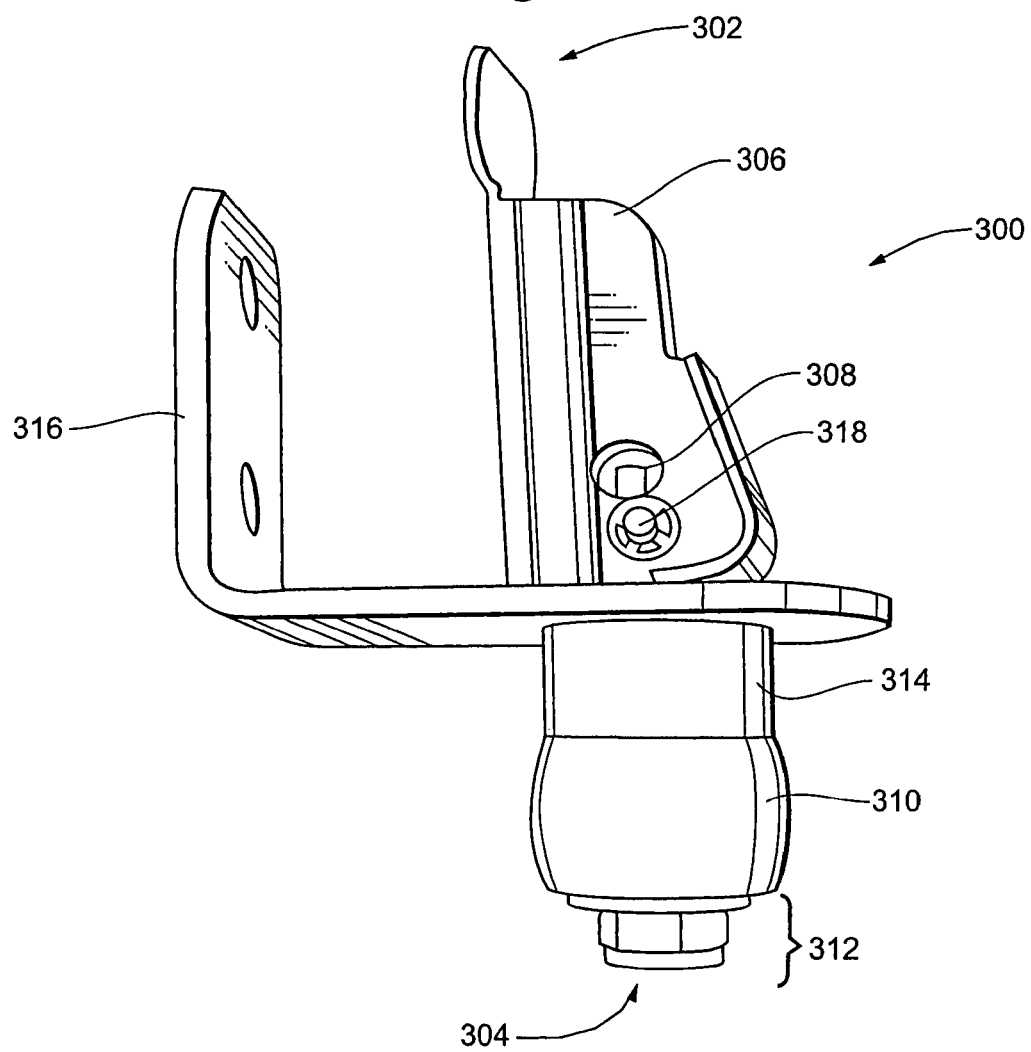

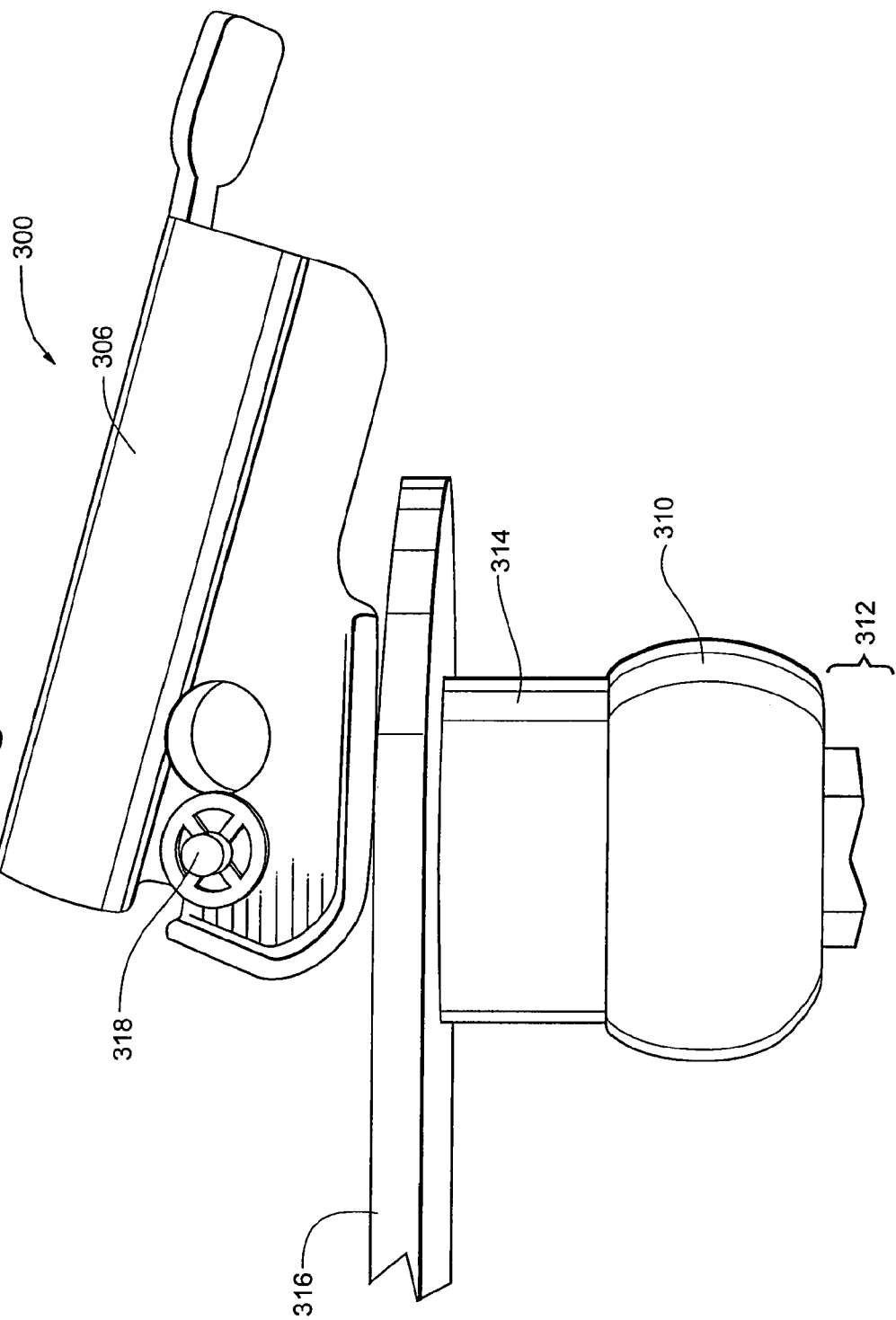

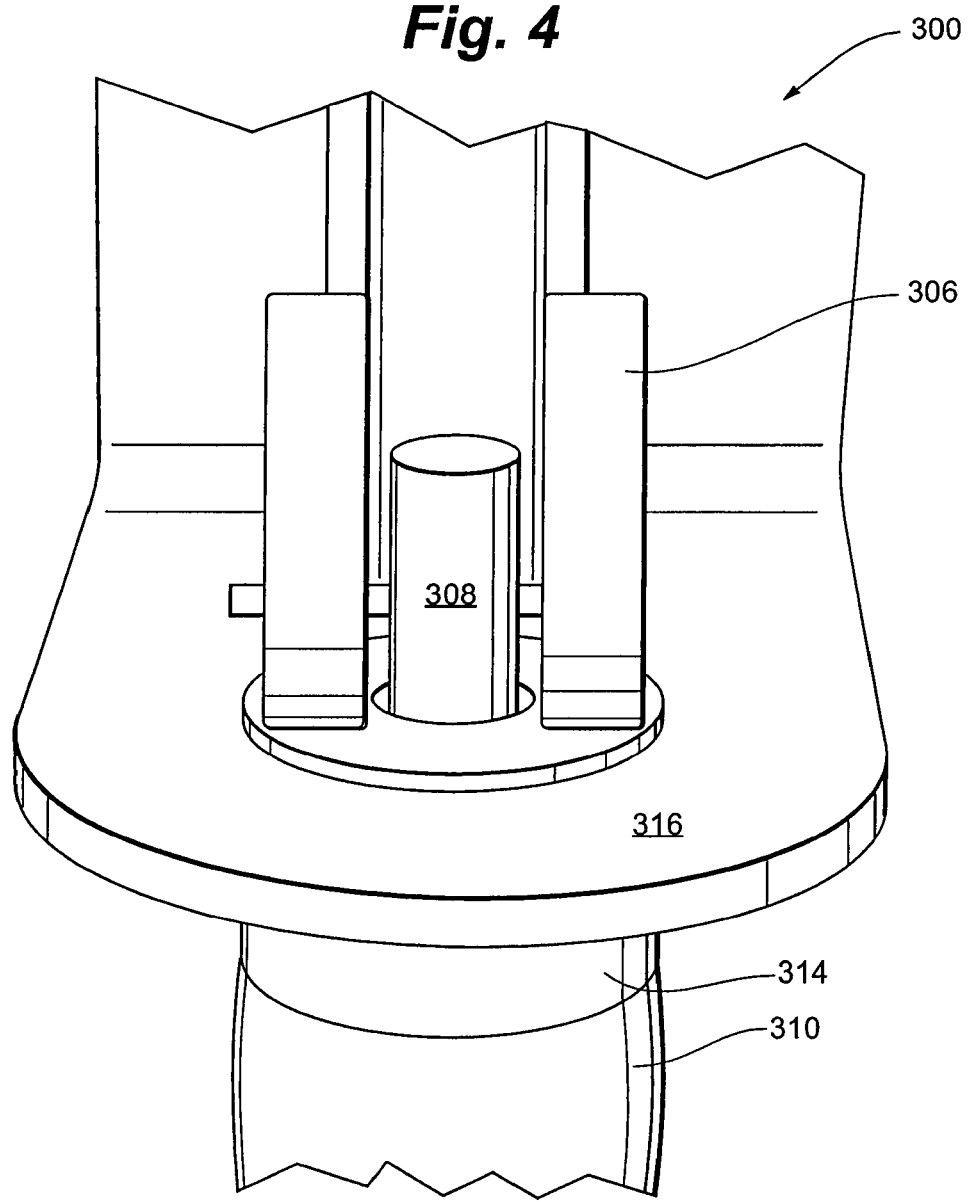

VEHICLE EXPANSION RETAINER

CROSS-REFERENCE TO RELATED APPLICATIONS

This application is a continuation of U.S. patent application Ser. No. 13/619,167, filed Sep. 14, 2012, which is a continuation of U.S. patent application Ser. No. 13/041,301, filed Mar. 4, 2011, now U.S. Pat. No. 8,267,034, which is a continuation of U.S. patent application Ser. No. 11/716,837, filed Mar. 12, 2007, now U.S. Pat. No. 7,975,640, which is a continuation of U.S. patent application Ser. No. 11/356,569, filed Feb. 17, 2006, now U.S. Pat. No. 7,222,582, which is a continuation of U.S. patent application Ser. No. 10/889,802, filed Jul. 13, 2004, now U.S. Pat. No. 7,055,454, the disclosures of which are expressly incorporated herein by reference.

FIELD OF THE INVENTION

This disclosure relates to powered vehicles and more particularly to snowmobiles, all terrain vehicles (ATV), personal watercraft, utility vehicles (UV), motorcycles having surfaces to hold accessories, and more specifically fastening accessories to a vehicle accessory platform.

BACKGROUND OF THE INVENTION

Current accessory latching systems require bolting the accessory to the rack, a process that can require a significant amount of time and effort. Generally this requires taking a plate, such as a steel flat plate, and placing it on the bottom side of an ATV rack, such as a steel tube rack or a composite rack, and then sandwiching the rack with another plate on top of the rack and fastening the two plates together with U-bolts or some other type of fastener. An accessory can then be mounted to the rack above or to the top plate. This system is expensive and the mounting process is very laborious and time consuming. Further, the inaccessibility to the bottom side of the rack plus the amount of time it takes putting the plate on the bottom and running bolts up through the bottom plate made this system undesirable. Other accessory latching systems utilize a receiver style mount in the rack, which receives a pin or the like which is then fastened to the accessory. In this system the receiver style mount must often be cleared of dirt and other materials due to the environment the ATV can be used in before the pin can be inserted. Other accessory latching systems utilize a handle that goes through the rack then the operator reaches under the rack and turns a spring loaded distal end so it is perpendicular to the axis of the hole thus preventing the removal of the handle. The handle is then attached to the accessory. Once again this system requires the operator to perform several steps to mount the accessory.

Attaching accessories or any other item to an ATV needs to be cost effective and simple. These latching systems must also be able to handle the rigor and generally "dirty" environment that an ATV is designed for. The capability to quickly attach and remove an item from the rack will significantly improve the quality and functionality of the accessories.

SUMMARY OF THE INVENTION

In some embodiments, a vehicle having an accessory attachment apparatus may include one or more of the following features: (a) a chassis carrying a seat, (b) at least one front wheel and at least one rear wheel coupled to the chassis, (c) a steering member for steering the at least one wheel, (d) an engine carried by the chassis for powering the vehicle, (e) at least one mounting aperture located on the vehicle, and (f) an expansion retainer having a proximal and distal end, having (i) a handle member, (ii) a shaft pivotally coupled to the handle member at the proximal end, the handle member pivotally rotatable between an open and closed position to move the shaft in an axial direction, (iii) a grommet located on the shaft at the distal end, (iv) a fastener coupled to the shaft at the distal end, whereby the expansion retainer is adapted to hold an accessory to the mounting aperture when the expansion retainer is received within the mounting aperture and the handle member rotated to a closed position, (v) a spacer member located proximal of the grommet, (vi) a bracket member coupled to the shaft at the proximal end between the handle member and the spacer member, and (vii) a washer member coupled to the shaft at the proximal end between the handle member and the spacer member.

In some embodiments, a vehicle having an apparatus for retaining accessories may include one or more of the following features: (a) a chassis carrying a seat, (b) at least one front wheel and at least one rear wheel coupled to the chassis, (c) a steering member for steering the at least one wheel, (d) means for powering the vehicle carried by the chassis, (e) at least one mounting aperture located on vehicle, and (f) an expansion retainer having a proximal and distal end, the distal end capable of being received by the mounting aperture, having (i) a handle member, (ii) a shaft pivotally coupled to the handle member at the proximal end, wherein the handle member can be pivotally rotated between an open and closed position to move the shaft in an axial direction, (iii) retainer means coupled at the distal end of the shaft, (iv) retention means coupled at the distal end of the shaft distally from the retaining means, whereby the expansion retainer is adapted to retainer an accessory to the mounting aperture when the expansion retainer is received within the mounting aperture and the handle member rotated to a closed position, (v) a spacer member located proximal of the retainer means, (vi) a bracket member coupled between the handle member and the spacer member.

In some embodiments, an accessory retainer apparatus for a vehicle may include one or more of the following features: (a) a handle member, (b) a shaft pivotally coupled to the handle member at the proximal end, the handle member pivotally rotatable between an open and closed position to move the shaft in an axial direction, (c) a grommet located on the shaft at the distal end, (d) a fastener coupled to the shaft at the distal end, whereby the accessory retainer is adapted to retain an accessory to a mounting aperture located on the vehicle, (e) a spacer member located proximal of the grommet, (f) a second grommet located between the handle member and the spacer, and (g) a bracket member coupled at the proximal end of the shaft between the handle member and the spacer member.

In some embodiments, an expansion retainer may include one or more of the following features:

(a) a handle member, (b) a shaft having a proximal and distal end; the shaft pivotally coupled to the handle member at the proximal end, wherein the handle member can be pivotally rotated between an open and closed position to move the shaft in an axial direction, (c) retainer means coupled at the distal end of the shaft, (d) retention means coupled at the distal end of the shaft distally from the retaining means, (e) a bracket member coupled at the proximal end of the shaft distally from the handle member for mounting accessories to the expansion retainer, and (f) a spacer member located proximal of the retainer means.

In some embodiments, a method for retaining accessories to a vehicle may include one or more of the following steps: (a) coupling an expansion retainer to an accessory, (b) inserting a distal end of the expansion retainer within an mounting aperture on the vehicle, and (c) rotating pivotally a handle member located on a proximal end of the expansion retainer between an open and closed position to move a shaft in an axial direction to compress a grommet against the mounting aperture.

In some embodiments, an accessory retainer for a vehicle may include one or more of the following features: (a) means for coupling an expansion retainer to an accessory, (b) means for inserting a distal end of the expansion retainer within an mounting aperture on the vehicle, (c) means for compressing a grommet against the mounting aperture, (d) a spacer member located between the handle member and the retainer means, and (e) a second grommet located between the handle member and the spacer.

In some embodiments, a vehicle may include one or more of the following features: (a) a chassis, (b) a seat mounted to the chassis, (c) a handlebar assembly carried by the chassis, (d) an endless track carried by a rear suspension system mounted to the chassis, (e) a front suspension system mounted to the chassis, (f) left and right steerable skis carried by the front suspension system, the skis being steerably connected to the handlebars, (g) an engine operably coupled to drive the endless track, (h) at least one mounting aperture located on the vehicle, (i) an expansion retainer having a proximal and distal end, (1) a handle member, (2) a shaft pivotally coupled to the handle member at the proximal end, the handle member pivotally rotatable between an open and closed position to move the shaft in an axial direction, (3) a grommet located on the shaft at the distal end, (4) a fastener coupled to the shaft at the distal end, whereby the expansion retainer is adapted to hold an accessory to the mounting aperture when the expansion retainer is received within the mounting aperture and the handle member is rotated to a closed position, and (5) a spacer member located proximal of the grommet.

In some embodiments, a vehicle may include one or more of the following features: (a) a hull including a bottom hull and a top deck secured over the bottom hull, the hull defining an engine compartment sized to contain an internal combustion engine for powering a jet propulsion unit, the jet propulsion unit including a steerable water discharge nozzle, the top deck having a raised, longitudinally extending seat adapted to accommodate an operator in straddle fashion, (b) at least one mounting aperture located on the vehicle, (c) an expansion retainer having a proximal and distal end, (1) a handle member, (2) a shaft pivotally coupled to the handle member at the proximal end, the handle member pivotally rotatable between an open and closed position to move the shaft in an axial direction, (3) a grommet located on the shaft at the distal end, (4) a fastener coupled to the shaft at the distal end, whereby the expansion retainer is adapted to hold an accessory to the mounting aperture when the expansion retainer is received within the mounting aperture and the handle member is rotated to a closed position, (5) a spacer member located proximal of the grommet.

In a further embodiment, a vehicle accessory comprising a retainer includes a handle member and a shaft extending in an axial direction between opposing proximal and distal ends. The handle member is pivotally coupled to the proximal end of the shaft, and is configured for pivoting movement between an open position and a closed position to move the shaft in an axial direction. The retainer includes a fastener supported by the distal end of the shaft, and a grommet supported by the shaft intermediate the fastener and the handle member, wherein the grommet radially expands when the handle is moved from the open position to the closed position. The retainer further includes a mounting member supported by the shaft. A vehicle accessory storage container is coupled to the mounting member and configured to be supported by a vehicle when the shaft of the retainer is inserted within a mounting aperture of the vehicle and the handle member is moved from the open position to the closed position.

In other embodiments, a vehicle accessory comprising a retainer includes a handle member and a shaft extending in an axial direction between opposing proximal and distal ends. The handle member is pivotally coupled to the proximal end of the shaft and configured for pivoting movement between an open position and a closed position to move the shaft in an axial direction. The retainer includes a fastener supported by the distal end of the shaft, and a grommet supported by the shaft intermediate the fastener and the handle member, wherein the grommet radially expands when the handle is moved from the open position to the closed position. In certain embodiments, the vehicle accessory includes a cargo holder coupled to the retainer and configured to be supported by a vehicle when the shaft of the retainer is inserted within a mounting aperture of the vehicle and the handle member is moved from the open position to the closed position. In certain other embodiments, the vehicle accessory includes a vehicle rider support coupled to the retainer and configured to be supported by a vehicle when the shaft of the retainer is inserted within a mounting aperture of the vehicle and the handle member is moved from the open position to the closed position. In certain other embodiments, the vehicle accessory includes a vehicle rider interface coupled to the retainer and configured to be supported by a vehicle when the shaft of the retainer is inserted within a mounting aperture of the vehicle and the handle member is moved from the open position to the closed position.

BRIEF DESCRIPTION OF THE DRAWINGS

FIG. 1C shows a side profile view of an ATV in an embodiment of the present teachings.

FIG. 2 shows a side profile of an expansion retainer in an open position in an embodiment of the present teachings.

FIG. 3 shows a side profile of an expansion retainer in a closed position in an embodiment of the present teachings.

FIG. 4 shows a front profile of an expansion retainer in an open position in an embodiment of the present teachings.

DETAILED DESCRIPTION OF EMBODIMENTS OF THE INVENTION

Figure 1:
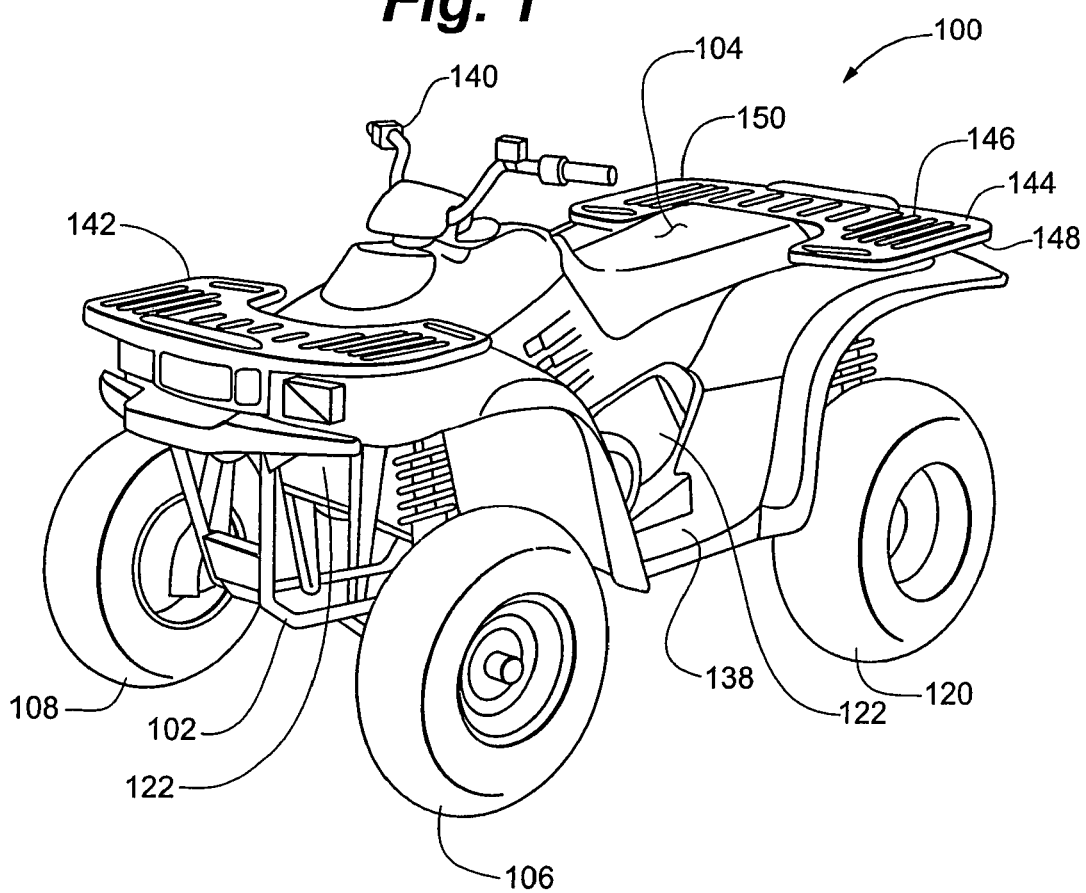
FIG. 1 shows a perspective view of an ATV in an embodiment of the present teachings.

The embodiments disclosed below are not intended to be exhaustive or to limit the invention to the precise forms disclosed in the following detailed description. Rather, the embodiments are chosen and described so that others skilled in the art may utilize their teachings.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. It is understood that the embodiments of the present teachings can be applied to snowmobiles, personal watercraft, utility vehicles, motorcycles, and ATVs; however, the present teachings are discussed below with reference to an ATV and a utility vehicle.

Figure 1A:
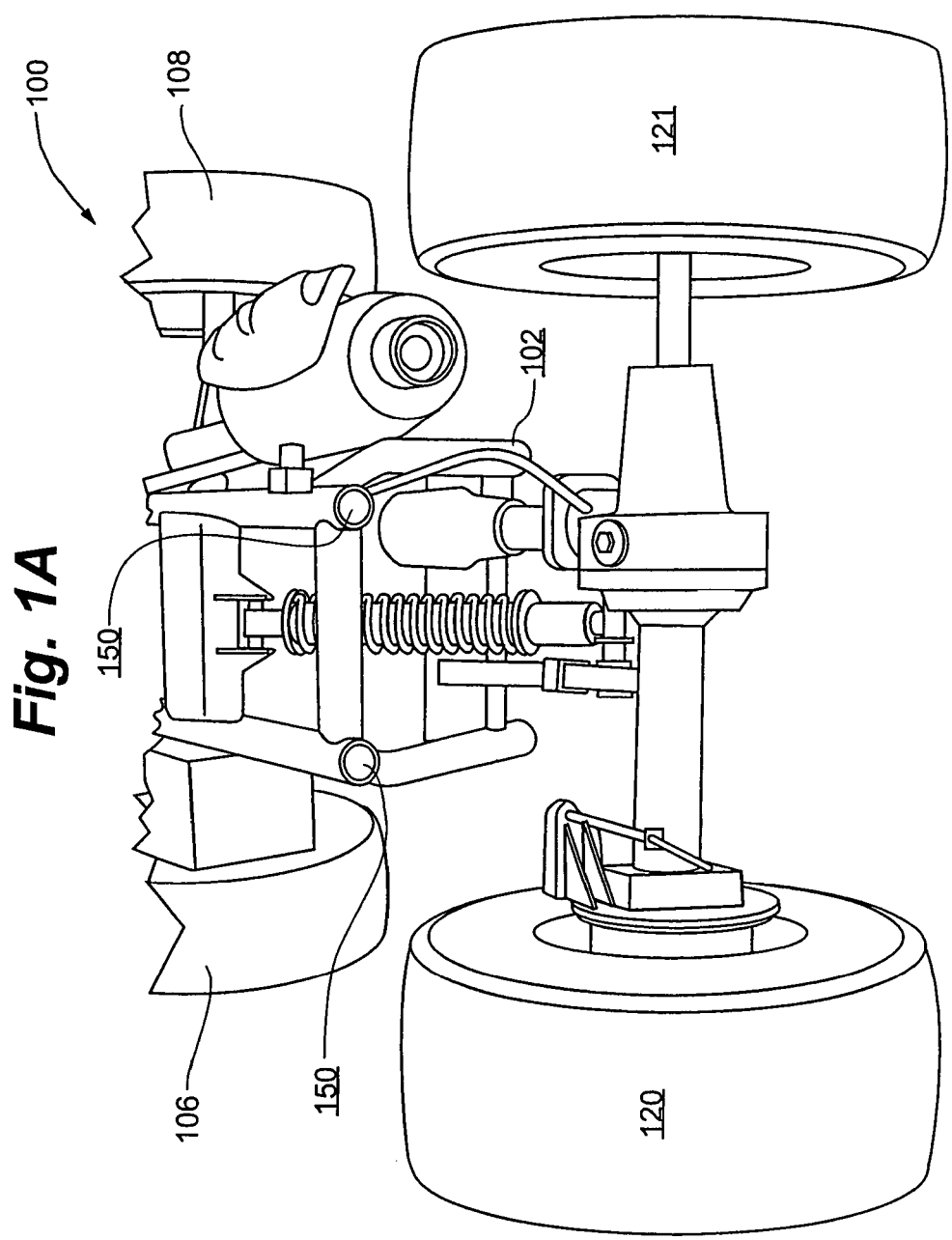
FIG. 1A shows a rear view of another ATV in an embodiment of the present teachings.

FIG. 1 is a perspective view of a vehicle 100 in accordance with an exemplary embodiment of the present teachings. Vehicle 100 of FIG. 1 can be generally referred to as an ATV. Vehicle 100 can have a chassis 102 carrying a straddle type seat 104. In FIG. 1, straddle type seat 104 is sufficiently narrow to be straddled by a vehicle rider. Vehicle 100 can have a left front wheel 106, a right front wheel 108, a left rear wheel 120, and right rear wheel 121 (FIG. 1A). In some embodiments, vehicle 100 could have tracks 123 as shown in FIG. 1C. Vehicle 100 can also include an engine 122 that is carried by chassis 102. Engine 122 can be coupled to at least some wheels of vehicle 100 via a drive train for propelling vehicle 100. Engine 122 can be used to power each rear wheel 120 and 121, and in some cases also each front wheel 106 and 108. It is fully contemplated other devices such as a motor could be used to power vehicle 100 without departing from the spirit of the present teachings.

Vehicle 100 can also include a first footrest 138 that can be seen extending from one side of the chassis 102 in FIG. 1. Vehicle 100 can also include a second footrest (not shown in FIG. 1) that extends from the other side of chassis 102. Vehicle 100 also includes member 140 that may be used for steering vehicle 100. In FIG. 1, steering member 140 comprises a handlebar. Vehicle 100 can also include at least one mounting aperture 150. For example, mounting aperture 150 can be located on accessory platforms 142 and 144 often referred to as racks. Accessory platforms 142 and 144 can have a top surface 146 and a bottom surface 148 coupled to chassis 102. Accessory platform 144 can have at least one mounting aperture 150 extending from top surface 146. It is fully contemplated mounting aperture 150 could be located anywhere on vehicle 100 such as chassis 102 (FIG. 1A), the body of vehicle 100, and footrest 138 without departing from the spirit of the present teachings.

Figure 1B:
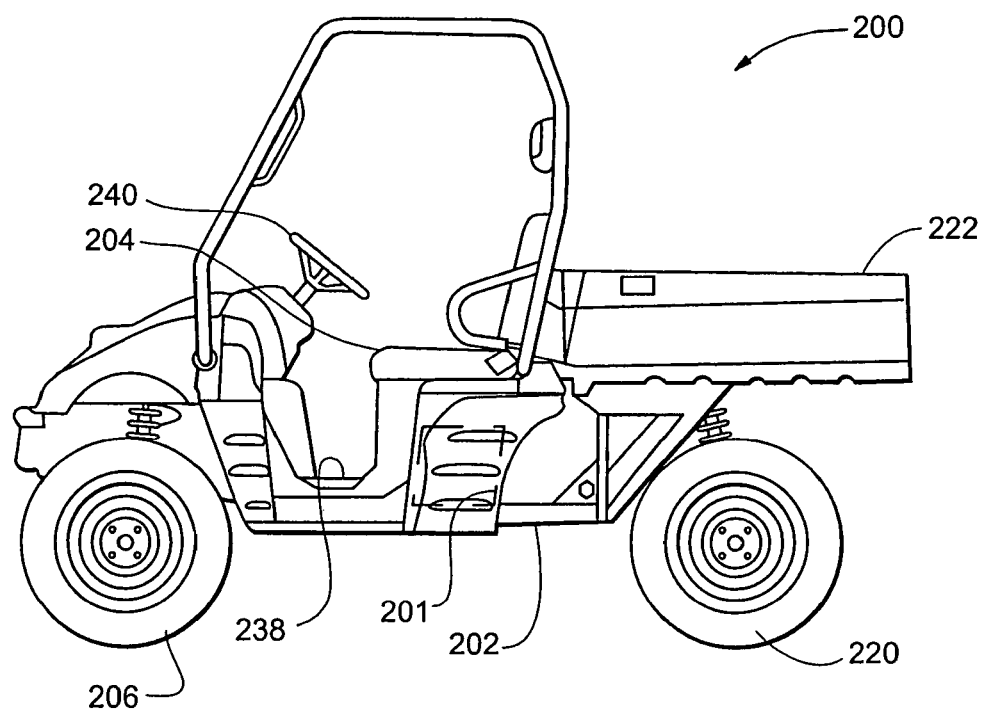
FIG. 1B shows a perspective view of a utility vehicle in an embodiment of the present teachings.

FIG. 1B is another perspective view of a vehicle in accordance with an embodiment of the present teachings. Vehicle 200 of FIG. 1B can be generally referred to as a utility vehicle. Vehicle 200 can have a chassis 202 carrying a bench type seat 204. In FIG. 1B, bench type seat 204 can be sufficiently wide to hold more than one vehicle rider. It is contemplated the embodiments for FIGS. 1 and 1B could have two seats, a seat large enough for two or more people to straddle, or side-by-side seating such as bucket style seats without departing from the spirit of the present teachings. Vehicle 200 can have a left front wheel 206, a right front wheel (not visible in FIG. 1A), a left rear wheel 220 and right rear wheel (not visible in FIG. 1A). In some embodiments, vehicle 200 could have tracks 123 similar to those shown in FIG. 1C. Vehicle 200 also includes an engine 201 that is carried by chassis 202. Engine 201 is preferably coupled to at least some wheels of vehicle 200 via a drive train for propelling vehicle 200. Engine 201 may be used to power any wheel on vehicle 200. It is fully contemplated that engine 201 could be a motor or any other apparatus to propel vehicle 200 without departing from the spirit of the present teachings.

Figure 9:
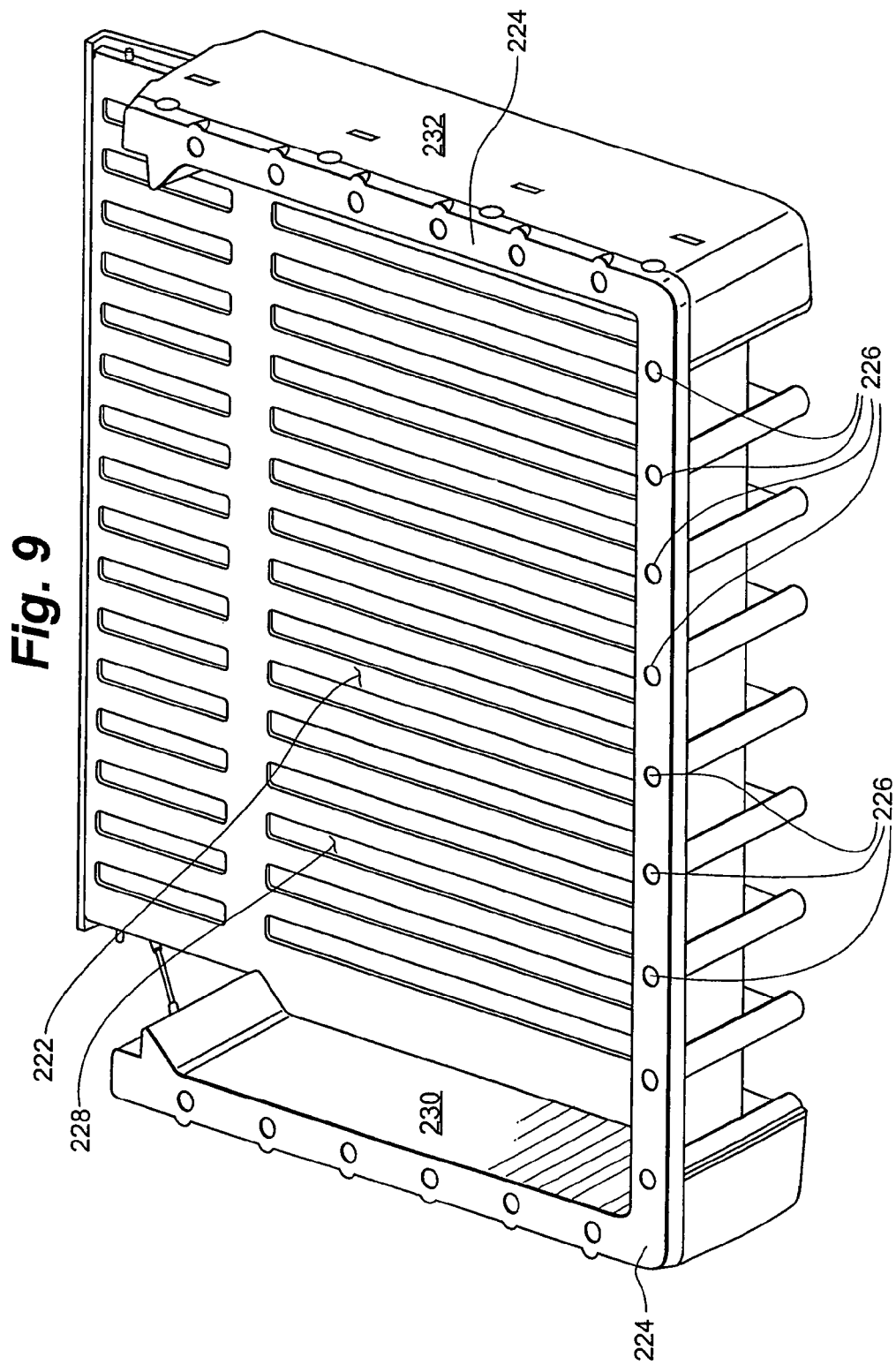
FIG. 9 shows an accessory platform for a utility vehicle in an embodiment of the present teachings.

Vehicle 200 can also include a footrest 238 that can be seen extending from one side of the chassis 202 to the other side. Vehicle 200 can also include at least one mounting aperture 226. For example, mounting aperture 226 can be located on accessory platform 222 often referred to as a box. Box 222 can extend from the rear of the chassis for carrying various items. Box 222 can have mounting apertures 226 similar to accessory platforms 142 and 144 located on the top of bed rail 224 (FIG. 9). It is further contemplated; box 222 could have mounting apertures located in bed 228, without departing from the spirit of the present teachings. Vehicle 200 can also include member 240 that may be used for steering vehicle 200. In the embodiment of FIG. 1A, steering member 240 comprises a steering wheel. Vehicle 200 can also have an accessory platform mounted to the front of the vehicle. It is fully contemplated mounting aperture 226 could be located anywhere on vehicle 200 such as chassis 202, the body of vehicle 200, and footrest 238 without departing from the spirit of the present teachings. It is further contemplated accessory platforms could include trailers without departing from the spirit of the present teachings.

Figure 1D:
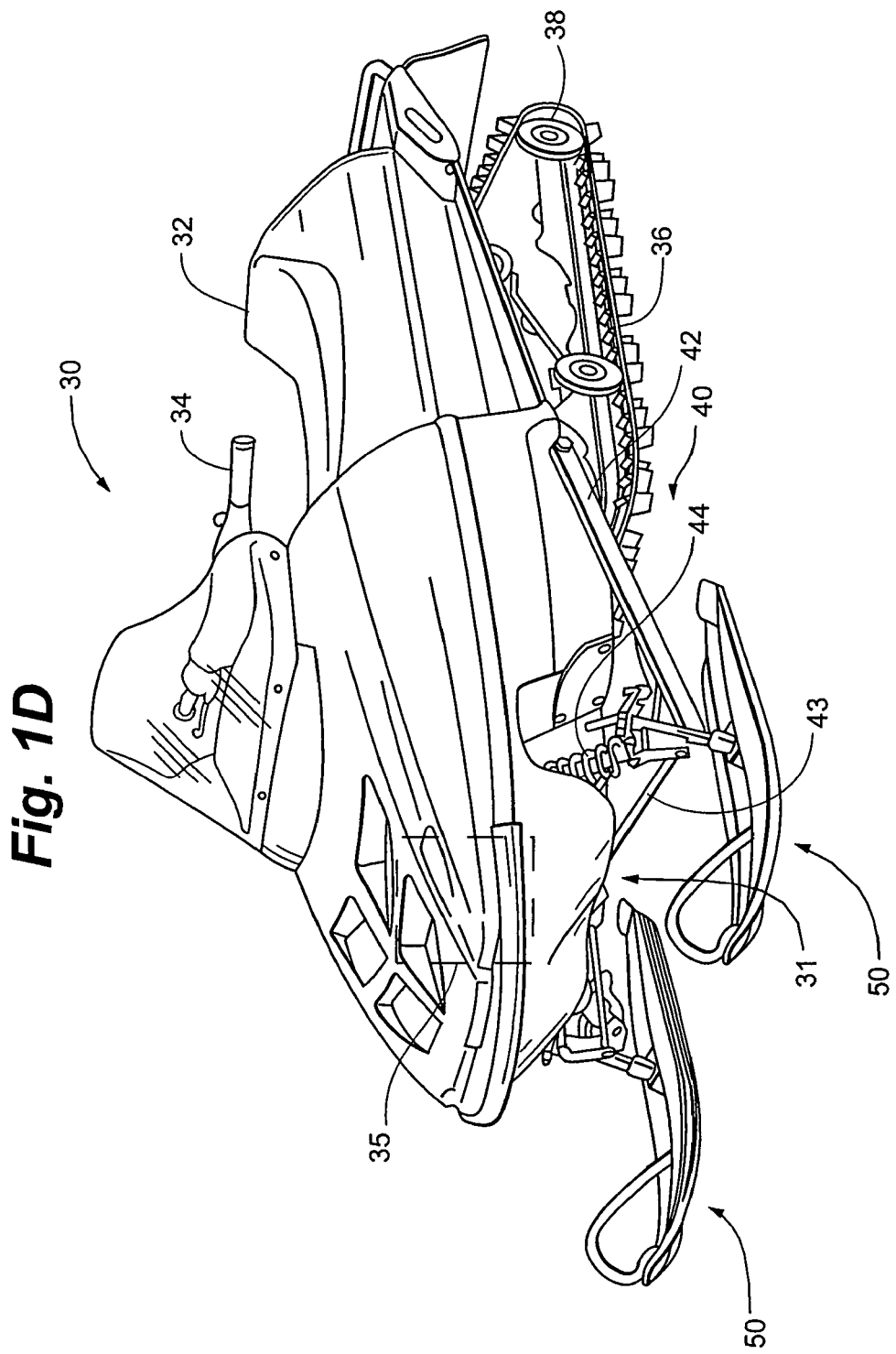
FIG. 1D shows a perspective view of a snowmobile that can incorporate some embodiments of the present teachings.

FIG. 1D depicts a snowmobile of the teachings. The snowmobile includes a chassis 31, a straddle type seat 32 mounted to the chassis 31, and a pair of handlebars 34 carried by the chassis 31 adjacent to the seat 32 so that a rider sitting in straddle fashion on the seat may steer the snowmobile using the handlebars 34. The snowmobile includes an endless track 36 carried by a rear suspension system 38 mounted to the chassis 31, the endless track being connected to and powered by the snowmobile's engine 35 (typically located beneath the hood near the front of the snowmobile). A fuel tank may be located under seat 32.

Left and right steerable skis 50 are carried by a front suspension system 40, which in turn is mounted to the chassis 31. The suspension system may be of any suitable type. In the drawings a trailing arm suspension system is depicted, such a system utilizing, for each ski, a trailing arm 42 connected at its rear end to the chassis, a pair of generally transversely mounted radius rods 43 connected at their inner ends to the chassis and at their outer ends to the front end of the trailing arm, and a shock/spring combination 44 connected at one end to the chassis 31 and at the other end to the front end of the trailing arm 42. Other suitable suspensions could also be utilized, however, including, e.g., a double A-arm (sometimes called "double wishbone") suspension or a telescopic strut suspension. Snowmobile 30 can also have mounting aperture 60 (FIG. 12) located anywhere on snowmobile 30, such as luggage rack 62.

Figure 1E:
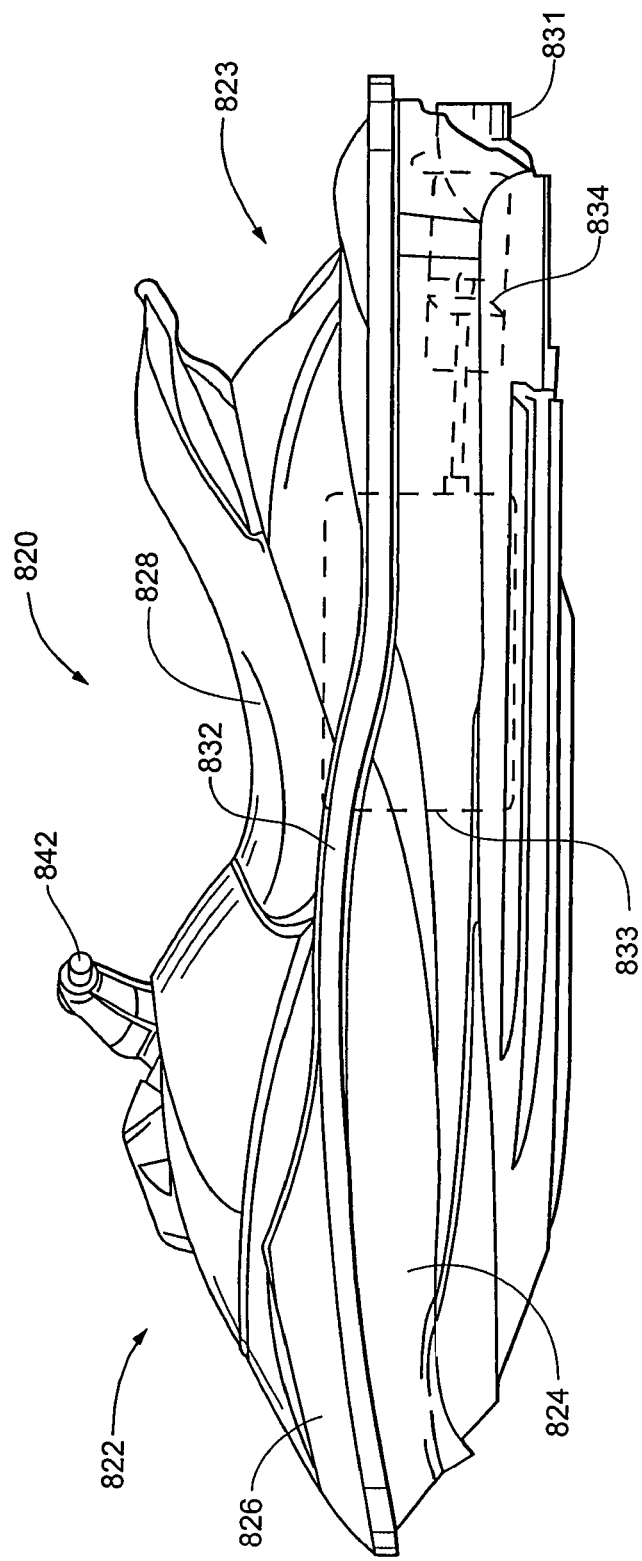
FIG. 1E shows a perspective view of a personal watercraft that can incorporate some embodiments of the present teachings.

With reference to FIG. 1E, a perspective view of a personal watercraft that can incorporate some embodiments of the present teachings is shown. FIG. 1E illustrates a personal watercraft 820 having generally a front or bow 822 and a rear or stern 823. The personal watercraft 820 includes a top deck 826 secured to a bottom hull 824 along an overlapping portion covered with a rub rail 832 in the embodiment illustrated, thereby forming a hull. An exhaust opening (not shown) can be located in top deck 826 or in bottom hull 824. The hull formed by the bottom hull 824 and top deck 826 define a compartment sized to contain an internal combustion engine 833 for powering the watercraft, and may also include one or more storage compartments, depending upon the size and configuration of watercraft 820. The deck portion 826 also has a raised, longitudinally extending seat 828 adapted to accommodate one or more riders seated in straddle fashion on the seat 828.

Figure 14:
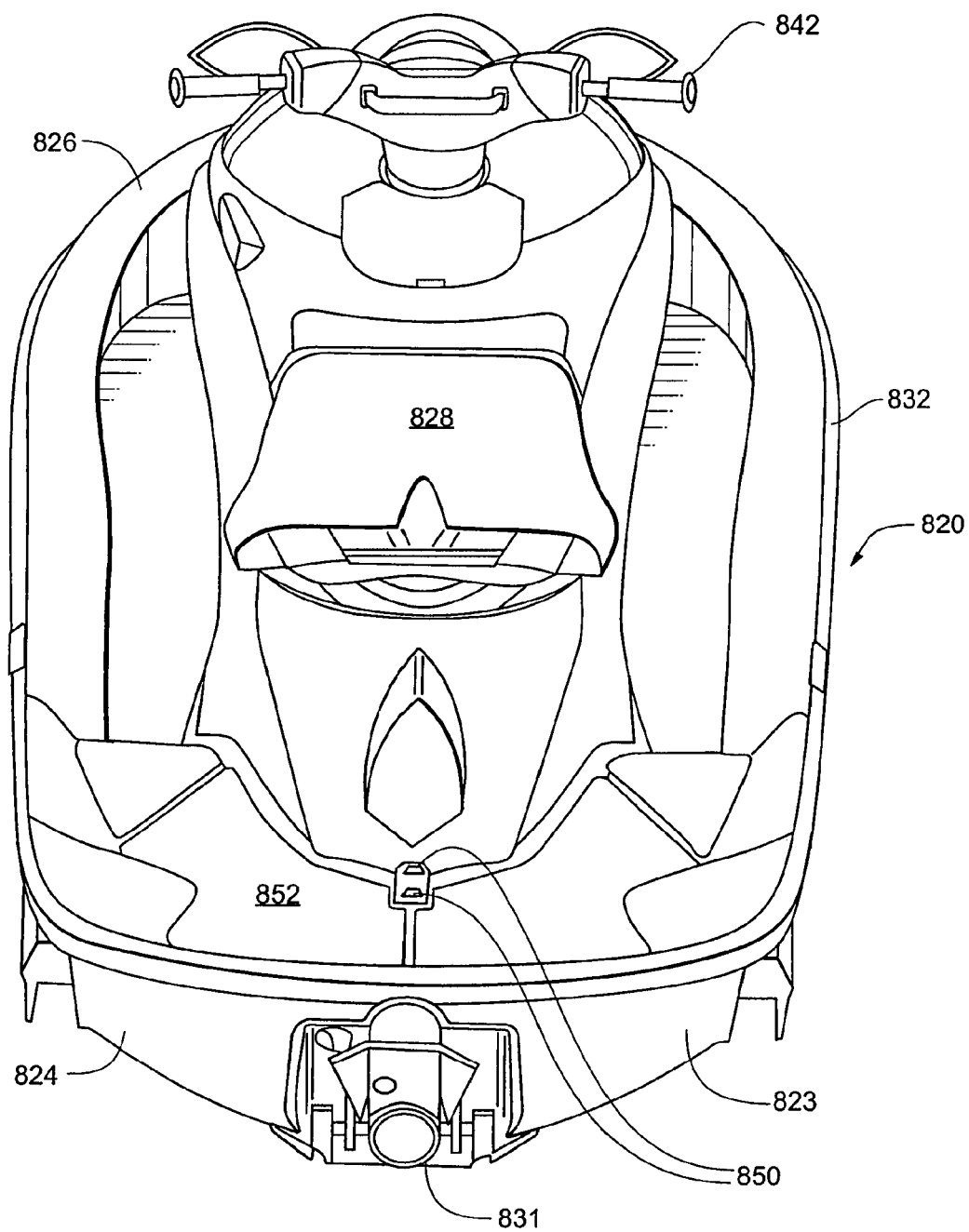
FIG. 14 shows a rear profile of a watercraft with mounting apertures in some embodiments of the present teachings.

Engine 833 powers a jet propulsion unit 834, typically mounted in a tunnel at the bottom rear portion of watercraft 820. Jet propulsion unit 834 includes a steerable water discharge nozzle 331 that is operatively connected to a set of handlebars 842 to facilitate steering of watercraft 820 by the operator. Engine 833 may be of the two or four cycle variety. Of course, engine 833 may have one or more cylinders, as appreciated by those skilled in the art. In engines of the four-stroke variety, engine 833 includes a lubricating system (not shown). The lubricating system includes an oil reservoir (not shown) that must be drained and refilled routinely. Hull 824 may be made of any suitable material including molded fiberglass, reinforced resin plastic, and/or a sheet of molding compound. It is also further contemplated that the present teachings could be utilized in other watercraft such as motorboats without departing from the spirit of the invention. Watercraft 820 can also have mounting aperture 850 (FIG. 14) located anywhere on watercraft 820, such as back platform 852.

Figure 1F:
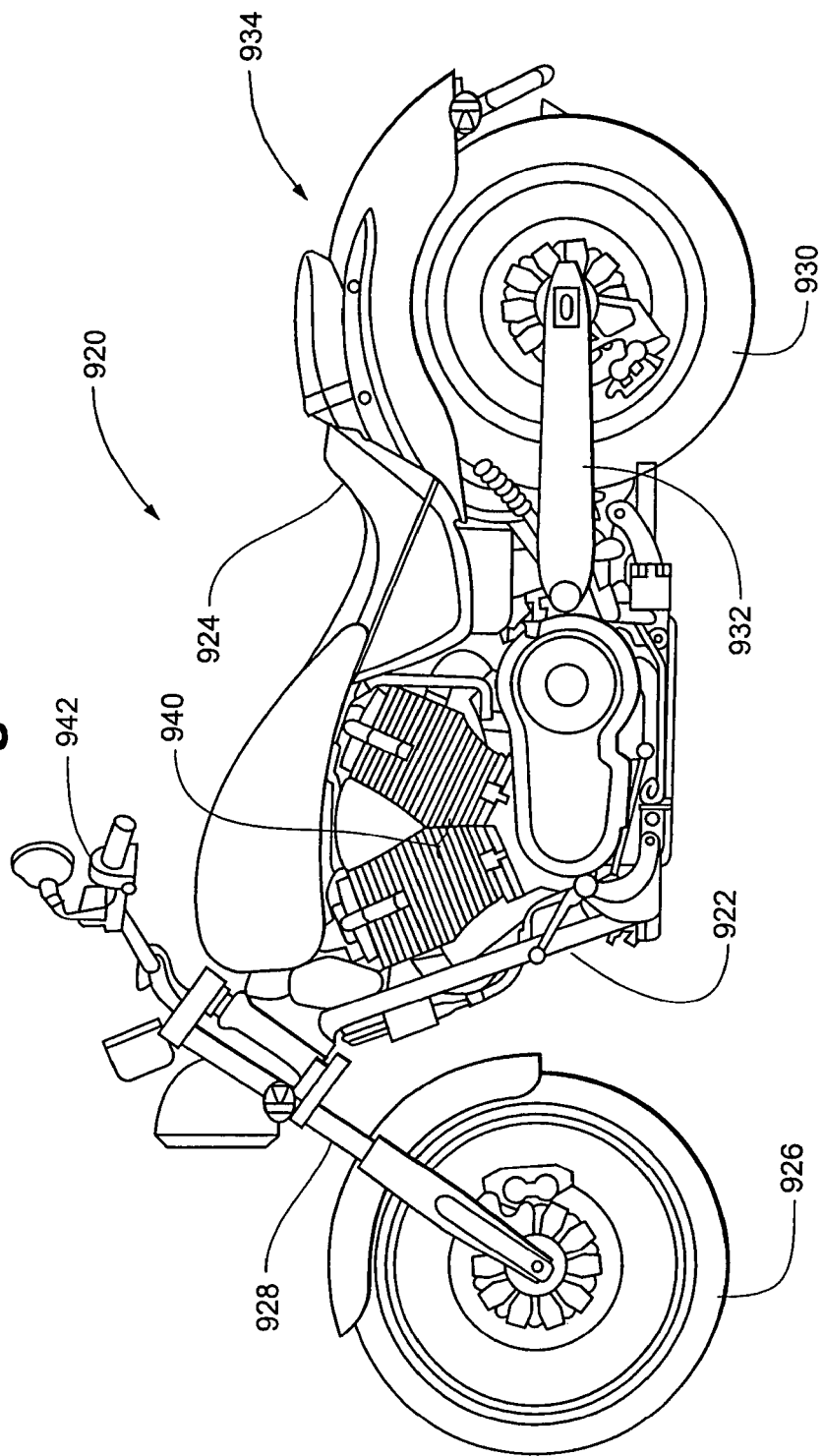
FIG. 1F is a side view of a motorcycle that can incorporate some embodiments of the present invention.

The motorcycle 920 illustrated in FIG. 1F includes a chassis 922, a seat 924 coupled to chassis 922, a front wheel 926 coupled to chassis 922 by a front fork 928, and a rear wheel 930 coupled to chassis 922 by a swing arm assembly 932. Steering member 942 can be used to steer wheel 926 or 930. A tail section 934 forms the rear portion of motorcycle 920 underneath seat 924 and above rear wheel 930. Motorcycle 920 can also have mounting aperture 950 (FIG. 15) located anywhere on motorcycle 920 to attach an accessory such as saddle bag 952. Engine 940 can be coupled to at least some of wheels 926 and 930 of motorcycle 920 for propelling motorcycle 920.

With reference to FIG. 2, a side profile of an expansion retainer in an open position in an embodiment of the present teachings is shown. Expansion retainer 300 has a proximal end 302 and a distal end 304, where distal end 304 is capable of being received by mounting aperture 406 (FIG. 5) or 226 (FIG. 9). Expansion retainer 300 can have a handle member 306, a shaft 308 pivotally coupled to handle member 306 at proximal end 302 allowing handle member 306 to be pivotally rotated between an open position (shown in FIG. 2) and closed position (shown in FIG. 3) to move shaft 308 in an axial direction, a grommet 310 located on shaft 308 at distal end 304, a fastener 312 coupled to shaft 308 at distal end 304, a spacer member 314 located proximal of grommet 310, and a bracket member 316 coupled at proximal end 302 of shaft 308 between handle member 306 and spacer member 314. Pin member 318 pivotally couples shaft 308 to handle member 306. Fastener 312 is illustrated as a nut and washer assembly, however, fastener 312 could be most any type of fastener such as a "C" shaped keyway, a large diameter nut, a cotter pin assembly, or a flange at the distal end of shaft 308 without departing from the spirit of the present teachings.

With reference to FIG. 3, a side profile of an expansion retainer in a closed position in an embodiment of the present teachings is shown. Handle member 306 can pivot about pin member 318 (FIG. 4) so when handle member 306 is moved from an open position to a closed position handle member 306 acts as a cam to move shaft 308 in an upward axial direction. This axial movement causes grommet 310 to be compressed between spacer 314 and fastener 312 thus expanding outward giving the grommet a greater diameter than it originally had as shown in FIG. 2. As illustrated, fastener 312 is a nut and washer assembly. When handle 306 is placed in the closed position, the washer on the bottom side prevents grommet 310 from expanding axially and causes it to expand radially outward. The nut and bolt assembly also provides some variability and adjustability for expansion retainer 300. For example, the operator could tighten the nut down to compress the rubber more or less, thus controlling the grommet's diameter during expansion.

Grommet 306 can be a rubber material, however, grommet 306 could be any material with similar elastic properties and strength to rubber without departing from the spirit of the present teachings. Further, while grommet 306 is illustrated as cylindrical, grommet 306 can have any shape. Spacer 314 can be made out of most any material including hard plastics, nylon, or metal and can be stiffer than grommet 310 as long as spacer 314 won't compress when handle member 306 is moved from the open to closed position. Spacer 314 can be used to insure grommet 310 is located within mounting aperture 406 (FIG. 6) or 226 (FIG. 9), which is discussed in more detail below. Bracket member 316 can be used to attach expansion retainer 300 to an accessory or any other item to be retained to mounting aperture (FIG. 6) or 226 (FIG. 9) and is discussed in more detail below. An accessory can be an item desirable to be attached to a vehicle such as a weed sprayer, cargo, or even vehicle accessories such as a radio. Bracket member 316 is illustrated as an "L" bracket, but could be most any type of bracket or have most any shape to attach accessories to expansion retainer 300. Alternatively, an oversized washer 520 (FIG. 10) could be substituted for bracket member 316 where oversized washer 520 would rest upon the top of an accessory and hold the accessory to accessory platform 222 when handle member 306 was rotated to the closed position.

Figure 5:
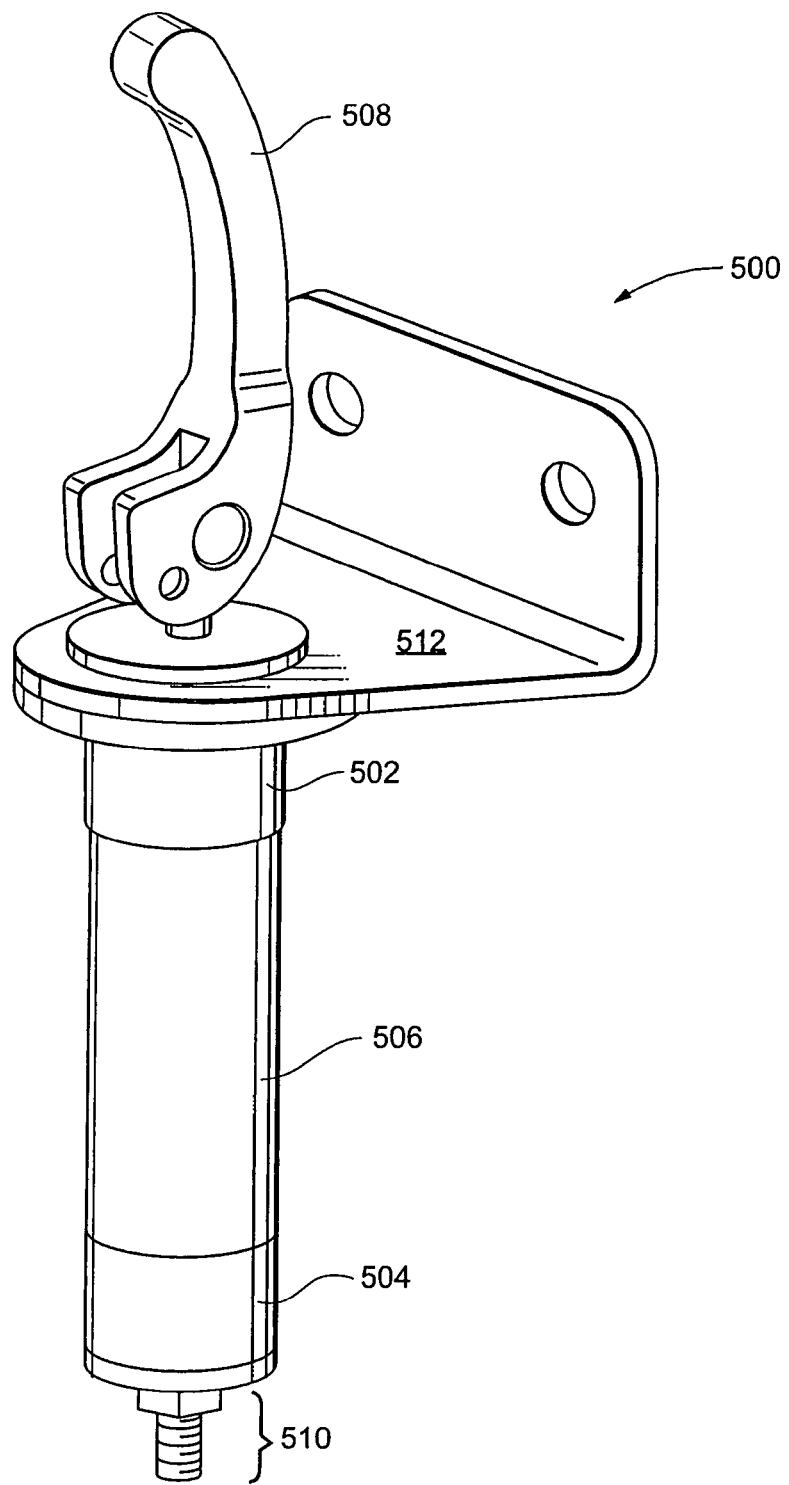
FIG. 5 shows a side profile of an expansion retainer in an open position in an embodiment of the present teachings.

With reference to FIG. 5, a side profile of an expansion retainer in an open position in an embodiment of the present teachings is shown. In some embodiments, expansion retainer 500 can have two grommets 502 and 504 located between spacer 506. When handle member 508 is moved from an open to a closed position, a shaft (not shown) is moved upward in an axial direction. As the shaft is moved upward, grommet 504 is compressed between spacer 506 and fastener 510 and grommet 502 is compressed between bracket 512 and spacer 506.

Figure 6:
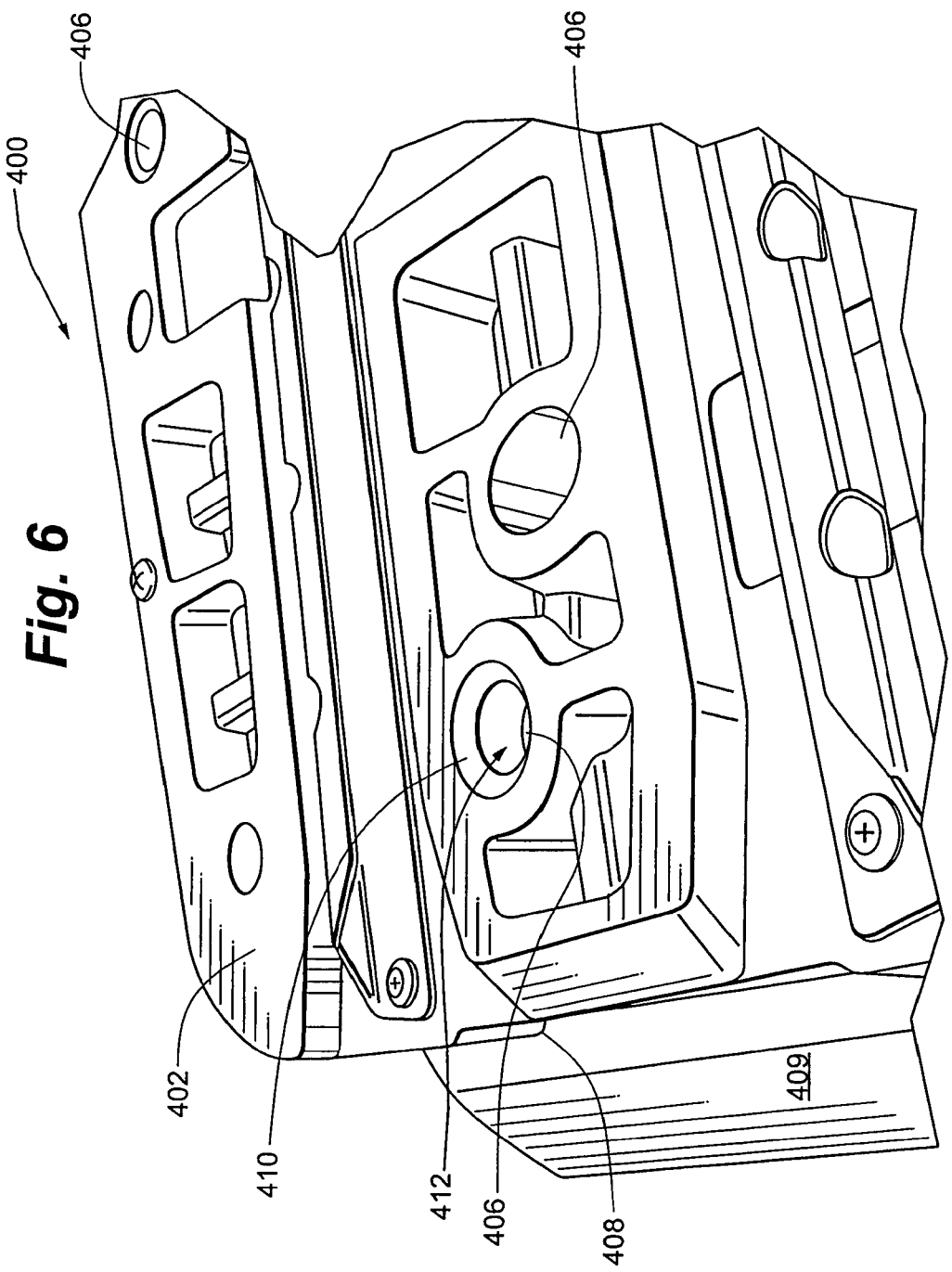
FIG. 6 shows an elevated profile of an accessory platform in an embodiment of the present teachings.

With reference to FIG. 6, an elevated profile of an accessory platform in an embodiment of the present teachings is shown. Accessory platform 400 can have a top surface 402 and a bottom surface 408 coupled to chassis 404. Accessory platform 400 can be a glass filled plastic, however, accessory platform 400 can be made out of most any material, such as plastic, metal, or wood without departing from the spirit of the present teachings. As illustrated, accessory platform 400 can have at least one mounting aperture 406. In some embodiments, mounting aperture 406 extends from top surface 402 to bottom surface 408. In other embodiments, mounting aperture 406 extends from top surface 402 within accessory platform 400. It is helpful if mounting aperture 406 extends from top surface 402 to bottom surface 408 to prevent debris from collecting within. Debris would prevent expansion retainer 300 from being properly located within mounting aperture 406 to ensure adequate clamping force. By having mounting aperture 406 extending from top surface 402 to bottom surface 408, aperture 406 is generally self cleaning and therefore does not require any preparation before placing retainer 300 within aperture 406.

Mounting aperture 406 can have a slightly larger diameter than grommet 310 in order to accept grommet 310 into mounting aperture 406 during insertion of retainer 300 or retainer 500. Mounting aperture 406 can have a chamfer 410 on top surface 402, which allows the operator to center expansion retainer 300 quickly, and to assist the operator in alignment when inserting retainer 300 into mounting aperture 406, as is discussed in more detail below. Mounting aperture 406 can have a draft 412 within to assist grommet 310 sliding into mounting aperture 406, however, it is contemplated mounting aperture 406 could be without a draft as long as mounting aperture 406 can accept grommet 310 within. However, a draft can assist in the insertion of grommet 310 into mounting aperture 406. Additionally, grommet 310 can have a diameter less than the diameter of mounting aperture 406 so grommet 310 can be received within mounting aperture 406.

Figure 7:
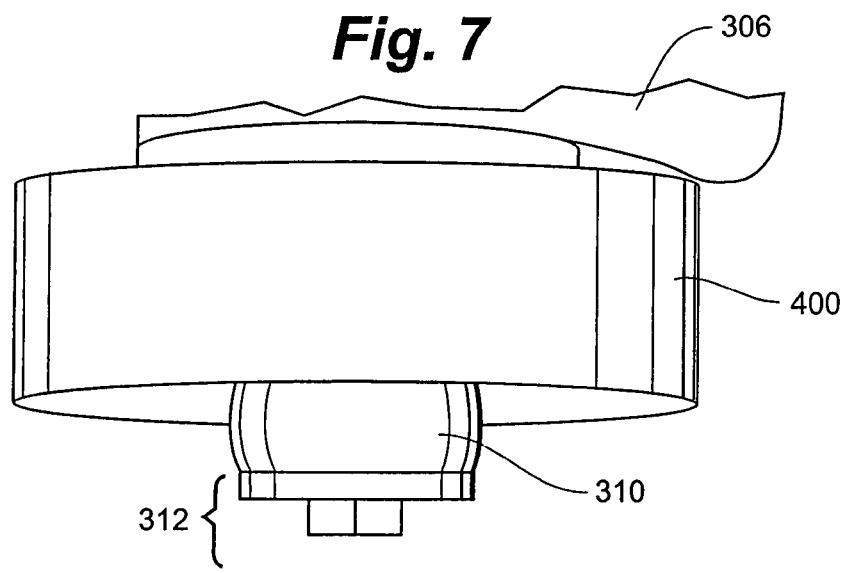
FIG. 7 shows a front profile of an expansion retainer in a closed position within an accessory platform in an embodiment of the present teachings.

In some embodiments, the axial length of mounting aperture 406 can be slightly shorter than the axial length from bracket member 316 to grommet 310. In this embodiment, a portion of or all of grommet 310 can protrude beyond bottom surface 408 of accessory platform 400. When handle member 306 is moved from the open to closed position, grommet 310 compresses and expands radially outward, increasing its diameter and by doing so becomes larger than the diameter of mounting aperture 406 as shown in FIG. 7. When compressed grommet 310 expands larger than the diameter of mounting aperture 406 or 226 and, therefore, retainer 300 cannot be pulled back through mounting aperture 406 or 226. Further when compressed below bottom surface 408, expansion retainer 300 is pulled toward top surface 402 as well as any accessory coupled to retainer 300. Grommet 310 can expand either within mounting aperture 406 or 226 or below bottom surface 408 thus making it very difficult to pull retainer 300 through or out of mounting aperture 406 or 226. In other embodiments, where grommet 310 expands within mounting aperture 406 or 226, expansion retainer 300 or 500 is held within mounting aperture 406 or 226 by a friction force, which makes it difficult to pull retainer 300 or 500 from mounting aperture 406 or 226.

With reference to FIG. 5 once again, when handle member 508 is moved from the open position to closed position grommet 504 is compressed between spacer 506 and fastener 510 and grommet 502 is compressed between bracket 512 and spacer 506. When grommet 504 expands this prevents retainer 500 from being removed from mounting aperture 406 or 226. Grommet 502 can expand above top surface 402 or within mounting aperture 406 or 226, thus not only adding friction resistance against retainer 500 being removed from mounting aperture 406 or 226, but grommet 502 also can act a sound dampener to prevent noise when the accessory is bouncing against accessory platform 400 during travel.

Expansion retainer 300 or 500 provides advantages and benefits over other mounting/clamping methods. Retainer 300 or 500 distributes the clamp force over a larger area than a bolt or pin. This allows for an increased load carrying capacity. It also decreases the possibility of casing damage to aperture surface or structure. Expansion retainer 300 or 500 is also significantly easier to use compared to other accessory mounting systems. The clamping operation is above the mounting surface and does not require tools. To fasten an accessory or object using expansion retainer 300 or 500 does not require removal of an accessory platform or working below the top surface of the platform. This decreases the time necessary to secure the object to the vehicle.

Figure 8:
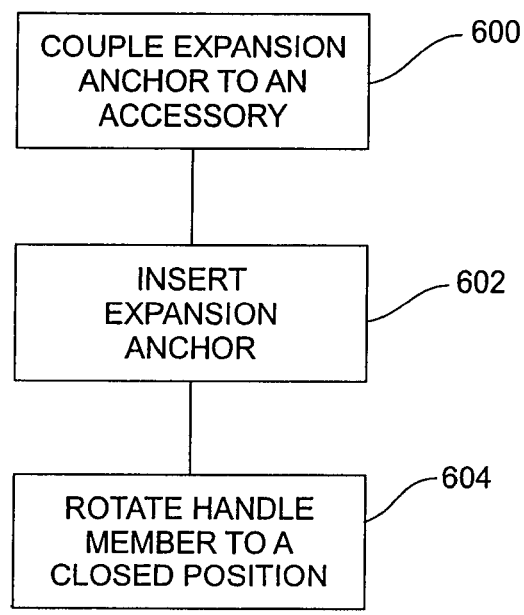
FIG. 8 shows a flow chart for the operation of an expansion retainer in an embodiment of the present teachings.

With reference to FIG. 8, a flow chart for the operation of an expansion retainer in an embodiment of the present teachings is shown. At state 600, expansion retainer 300 is coupled to an accessory. Distal end 304 can be inserted into mounting aperture 406 of accessory platform 400 at state 602. Handle member 306 can be rotated pivotally from an open position to a closed position, thus moving shaft 308 in an axial direction to compress grommet 310 and retaining expansion retainer 300 within mounting aperture 406 at state 604.

Figure 10:
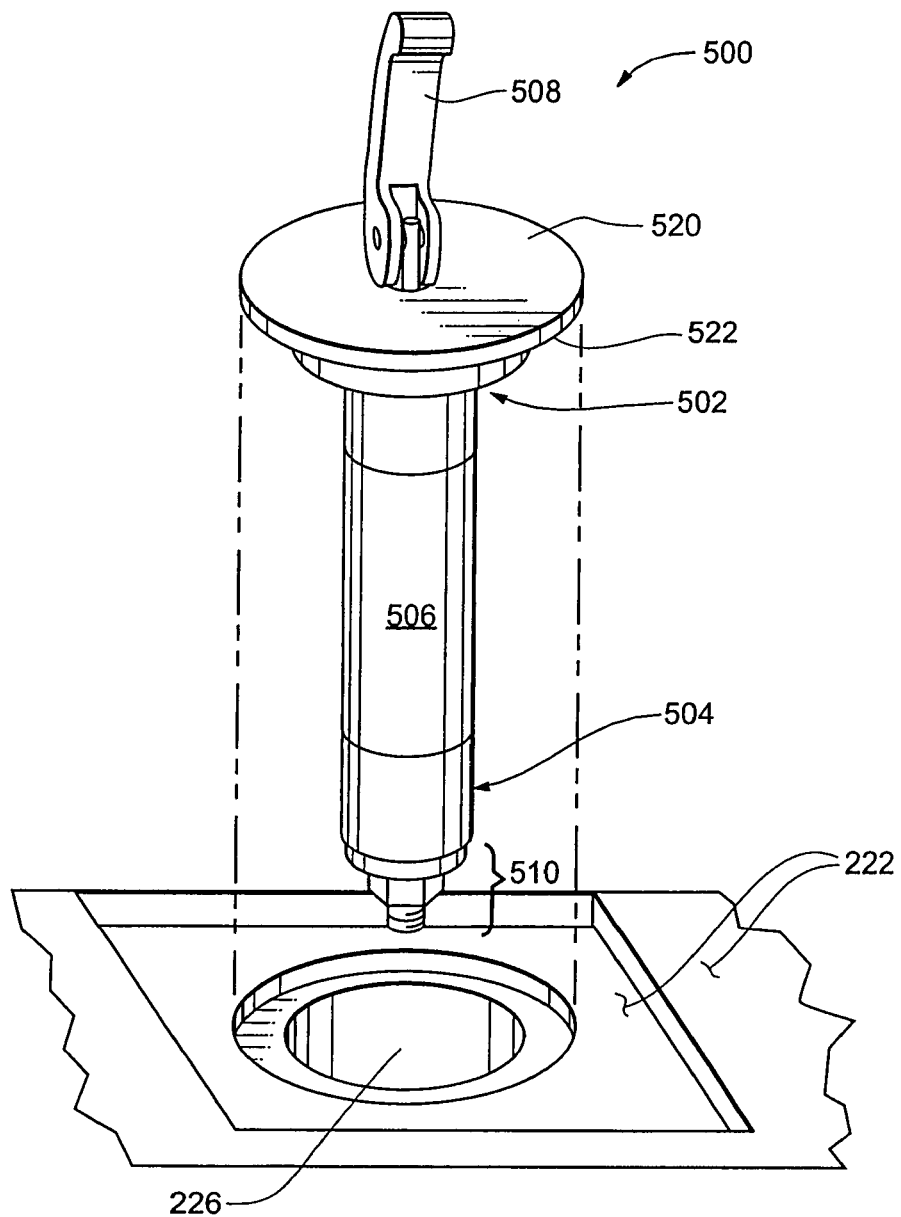
FIG. 10 shows a side profile of an expansion retainer in an open position for insertion into an accessory platform in an embodiment of the present teachings.

With reference to FIG. 10, a side profile of an expansion retainer in an open position for insertion into an accessory platform in an embodiment of the present teachings is shown. Expansion retainer 500 can also be coupled to an accessory with bracket 512, however, expansion retainer 300 or 500 can also be coupled to an accessory with an oversized washer 520. An accessory could be placed within box 222 generally near two adjacent sides, such as sides 230, 232, and 234. When the accessory was in position near two or more adjacent sides, retainer 500 could be placed within mounting aperture 226. As mounting aperture 226 slides into mounting aperture 226, bottom surface 522 of washer 520 could come in contact with the top surface of an accessory. Handle 508 could then be rotated to a closed position thus expanding grommets 502 and 504 to retainer expansion retainer 500 within mounting aperture 226 and thus providing a downward holding force to the accessory. As can be seen from FIG. 9, box 222 can have a plurality of mounting apertures 226 allowing for the use of several retainers 500 to provide additional clamping forces. It is contemplated the accessory could come with its own coupling connection which would line up with apertures 406 or 226 and a retainer 300 or 500 could be used without a bracket 512 or washer 520.

Figure 11:
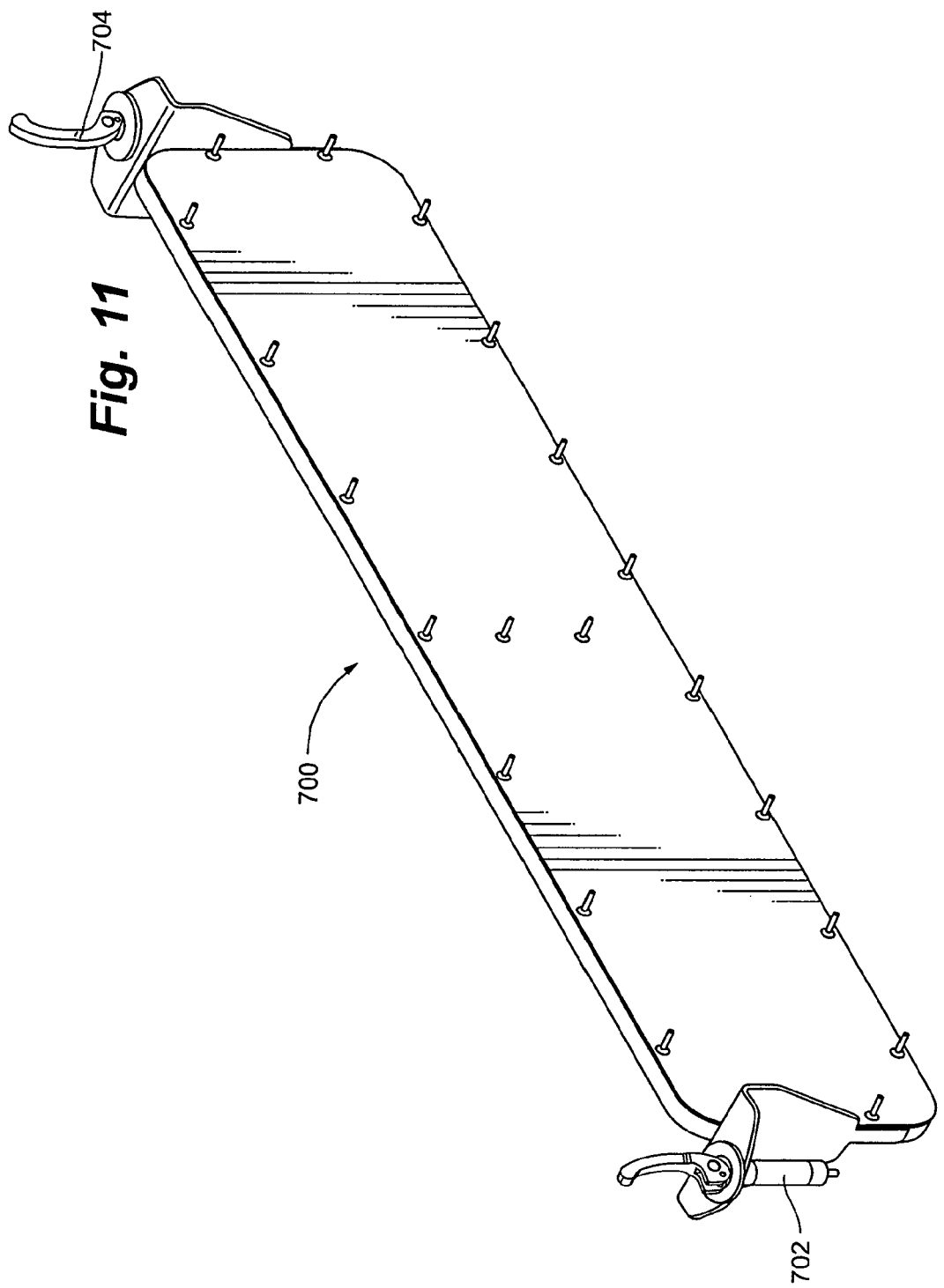
FIG. 11 shows a box divider with integral brackets in an embodiment of the present teachings.

With reference to FIG. 11, a box divider with integral brackets in an embodiment of the present teachings is shown. Divider 700 allows the vehicle operator to separate box 222 into several compartments for holding accessories. Divider 700 could be placed in box 222 where mounting apertures 226 would receive retainers 702 and 704 on opposite sides of box 222, for example sides 230 and 232. Retainers 702 and 704 could then be rotated to a closed position to retainer divider 700 to box 222. Divider 700 allows a vehicle operator to easily separate box 222 into multiple compartments, which can be helpful to the operator, for example, if the operator were hauling two materials he did not wish to get mixed.

Figure 12:
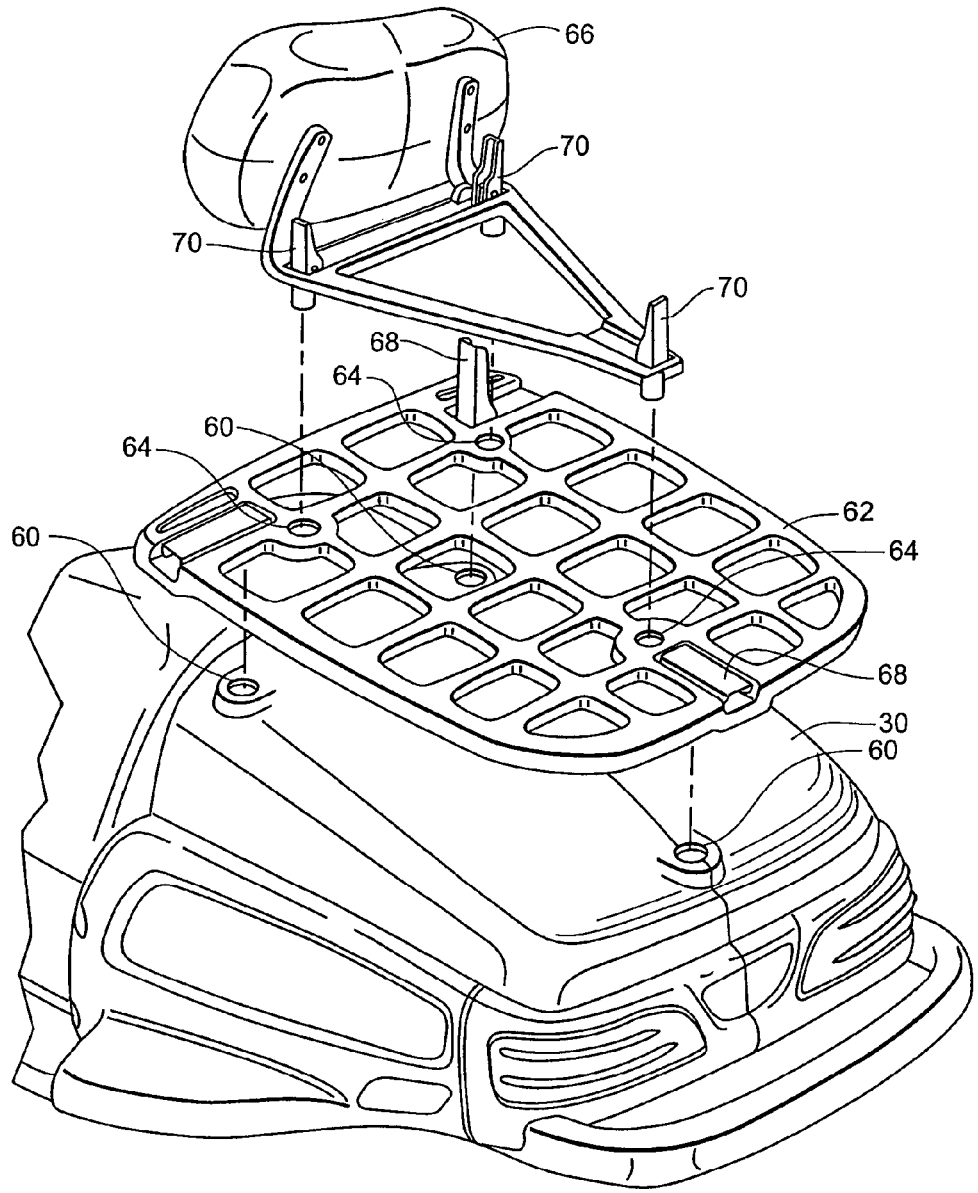
FIG. 12 shows a rear profile of a snowmobile with rack mounting system in some embodiments of the present teachings.

With reference to FIG. 12, a front profile of a quick removal mirror in some embodiments of the present teachings is shown. Snowmobile 30 can have one or more mounting apertures 60 to attach an accessory such as a luggage rack 62. Additionally, luggage rack 62 can have mounting apertures 64 to retain an accessory such as a backrest 66. In operation, the operator would place luggage rack 62 over mounting apertures lining up expansion anchors 68 with mounting apertures 60. Expansion anchors 68 are then pivoted to a closed position thus expanding the grommet to hold luggage rack 62. If the operator desires, they can then align expansion retainers 70 with mounting apertures 64 and place retainers 70 within apertures 64. Once again, retainers 70 are pivoted to a closed position expanding the grommet to retain backrest 66 to luggage rack 62.

Figure 13:
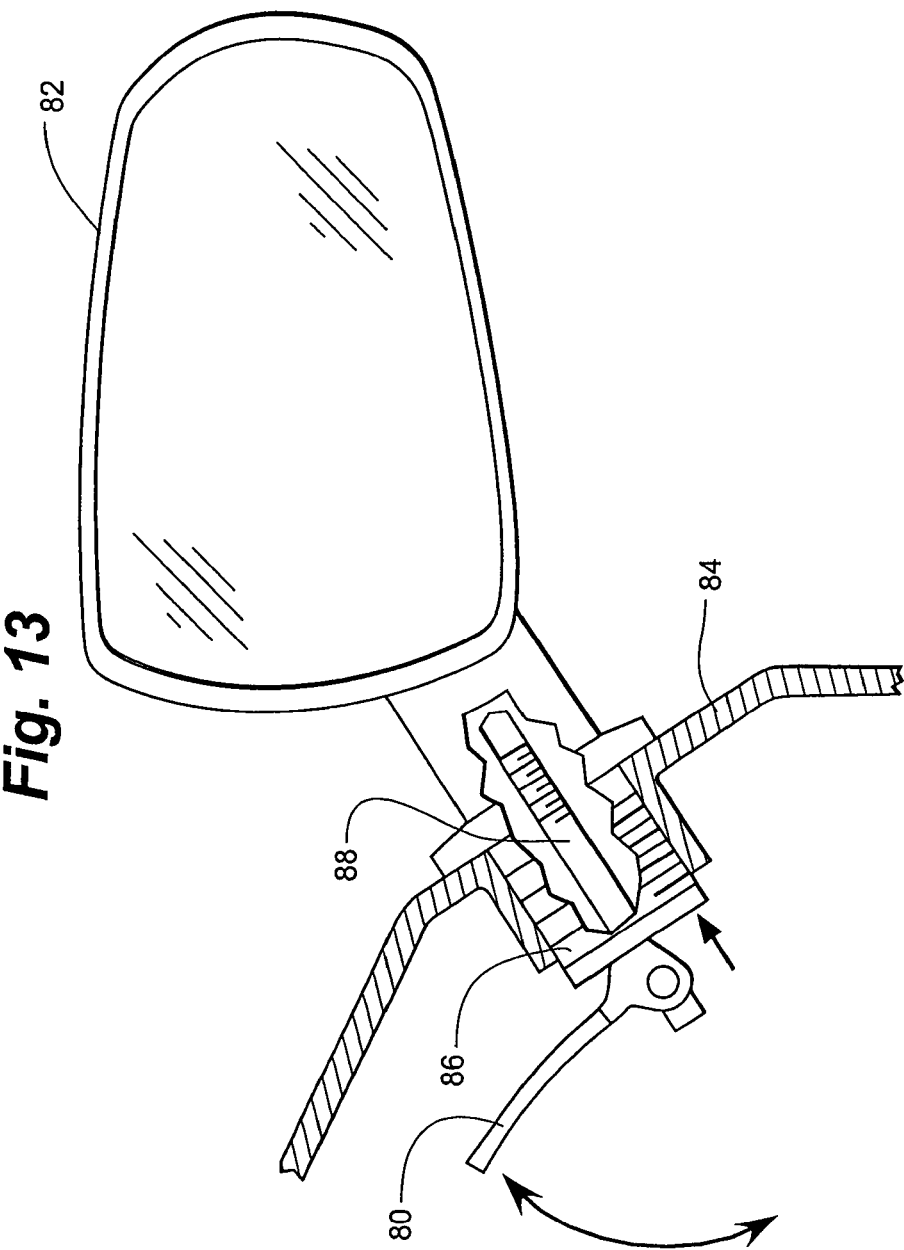
FIG. 13 shows a front profile of a quick removal mirror in some embodiments of the present teachings.

With reference to FIG. 13, a front profile of a quick removal mirror in some embodiments of the present teachings is shown. Similar to above, expansion retainer 80 can be used to attach an accessory such as a mirror 82 to snowmobile 30. In operation, the operator could raise hood 84 and place retainer 80 through mounting aperture 86. Mirror 82 could then be screwed upon shaft 88 until mirror 82 is snug against hood 84. The operator could then pivot retainer 80 from an open position to a closed position thus retaining mirror 82 firmly against hood 84.

Figure 15:
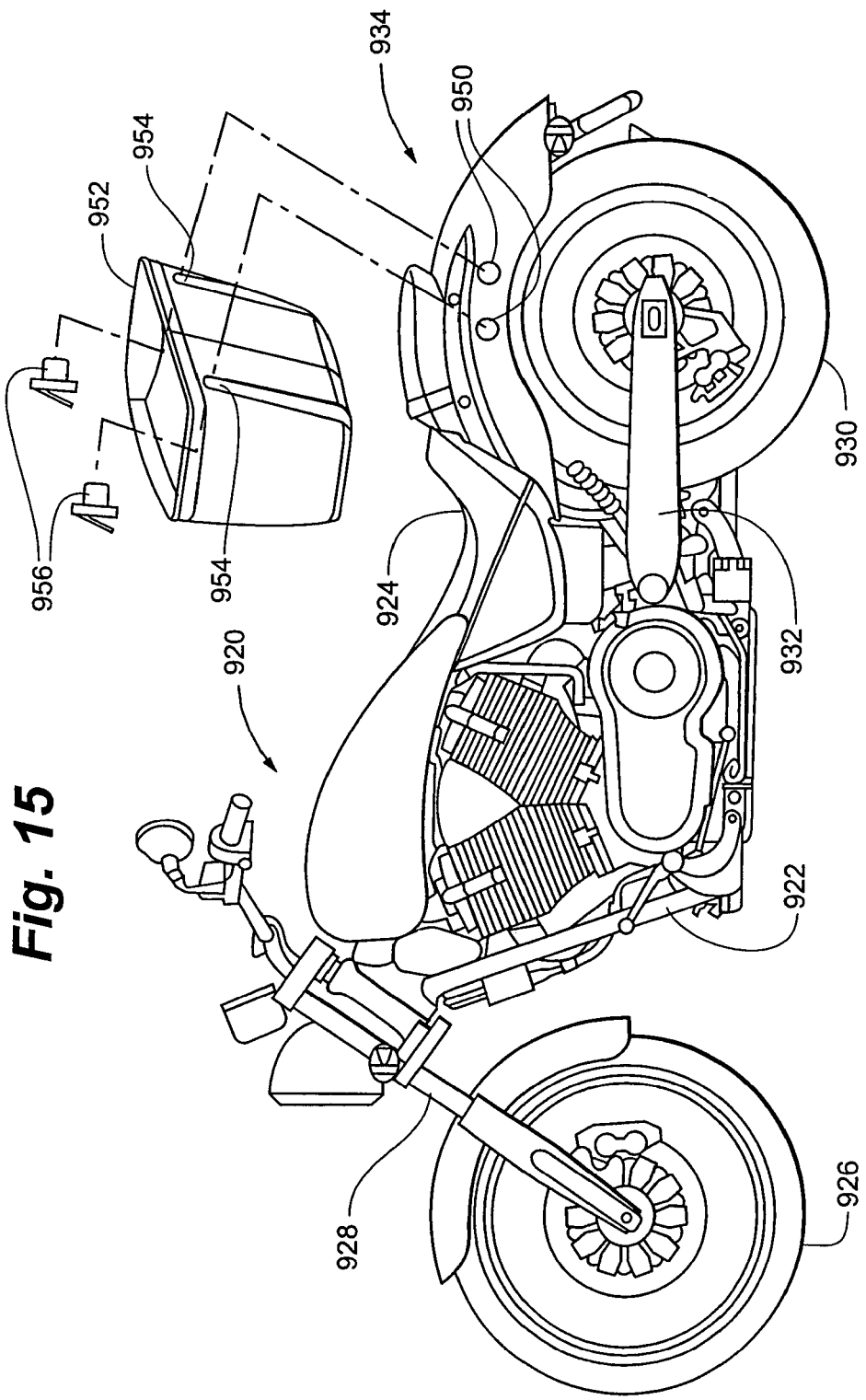
FIG. 15 shows a side profile of a motorcycle with mounting apertures in some embodiments of the present teachings.

With reference to FIG. 15, a side profile of a motorcycle with mounting apertures in some embodiments of the present teachings is shown. Similar to above, the vehicle operator can attach and accessory such as a saddle bag 952 to motorcycle 920. The operator would line up apertures 954 with mounting apertures 950. The operator would then insert expansion retainers 956 through apertures 954 into mounting apertures 950. When inserted expansion retainers is then pivoted from an open to a closed position to expand the grommet thus retaining saddle bag 952 to motorcycle 920.

The present teachings provide for a quick and inexpensive device for latching an accessory onto and off of a vehicle accessory platform system. Thus the operator would not need to access the bottom side of an accessory platform. The present teachings allow the operator to fasten an accessory from above an accessory platform and still maintain enough fastening strength to hold whatever size accessory to an accessory platform.

Thus, embodiments of the Vehicle Expansion Retainer are disclosed. One skilled in the art will appreciate that the present teachings can be practiced with embodiments other than those disclosed. The disclosed embodiments are presented for purposes of illustration and not limitation, and the present teachings are limited only by the claims that follow.

What is claimed is:

1. An accessory retainer for a vehicle, the retainer comprising:
    an actuation member;
    a shaft extending axially between a proximal end and a distal end, the shaft being coupled to the actuation member at the proximal end, the actuation member rotatable to move the shaft axially;
    a retainer member located on the shaft;
    a spacer located proximal of the retainer member;
    a retention member coupled to the shaft and located distal of the retainer member; and
    a mounting member supported by the shaft and adapted to retain an accessory to a mounting aperture located on the vehicle, wherein the retainer member moves relative to the spacer and the retention member when the actuation member is rotated.

2. The retainer of claim 1, wherein the shaft is pivotally coupled to the actuation member, the actuation member pivotally rotatable between a first position and a second position, the first position being an open position, and the second position being a closed position.

3. The retainer of claim 1, wherein the mounting aperture is located on an accessory platform coupled to the vehicle.

4. The retainer of claim 3, wherein the retainer member expands radially outward below a bottom surface of the accessory platform when the expansion retainer is received within the at least one mounting aperture and the actuation member is rotated.

5. The retainer of claim 1, wherein the actuation member is a handle.

6. The retainer of claim 1, wherein the retainer member expands radially outwardly against the mounting aperture when the retainer is received within the mounting aperture and the actuator member is rotated.

7. The retainer of claim 1, wherein the mounting member comprises at least one of a bracket member and a washer.

8. A method for retaining accessories to a vehicle, the method comprising the steps of:
    providing an expansion retainer with a mounting member for coupling to an accessory;
    inserting a distal end of the expansion retainer within a mounting aperture on a vehicle; and
    rotating an actuator member located on a proximal end of the expansion retainer between a first position and a second position to move a shaft in an axial direction for causing a grommet to compress between a spacer and a fastener, the grommet moving radially outward for securing the mounting member to the vehicle.

9. The method of claim 8, wherein the step of rotating the actuator member includes pivoting the actuator member between an open position and a closed position to move a shaft coupled to the actuator member in an axial direction to compress the grommet against the mounting aperture.

10. The method of claim 8, further comprising the step of supporting a platform on a vehicle, the platform including the mounting aperture.

11. The method of claim 8, wherein the mounting member comprises at least one of a bracket member and a washer.

12. The method of claim 8, further comprising the step of coupling an accessory to the mounting member.

13. An accessory retainer for a vehicle comprising:
    an accessory platform adapted to be coupled to a vehicle and including a mounting aperture;
    at least one mounting aperture located on the accessory platform;
    an expansion retainer having a proximal end and a distal end, comprising:
        an actuator member;
        a shaft coupled to the actuator member at the proximal end, the actuator member movable between a first position and a second position to move the shaft in an axial direction;
        a grommet located on the shaft;
        a fastener coupled to the shaft at the distal end;
        a mounting member supported by the shaft; and
    an accessory coupled to the mounting member;
    wherein the mounting member is adapted to retain the accessory to the mounting aperture located on the accessory platform, and the grommet expands radially when the actuator member is moved from the first position to the second position.

14. The retainer of claim 13, wherein the shaft is pivotally coupled to the actuator member, the actuator member pivotally rotatable between the first position and the second position, the first position being an open position, and the second position being a closed position.

15. The retainer of claim 13, further comprising a spacer supported by the shaft, wherein the grommet is compressed between the spacer and the fastener and expands radially outward when the actuator member is moved to the second position.

16. The retainer of claim 13, wherein the grommet expands radially outward below a bottom surface of the accessory platform when the expansion retainer is received within the at least one mounting aperture and the actuator member is moved to the second position.

17. The retainer of claim 13, wherein the grommet expands radially outwardly against the mounting aperture when the retainer is received within the mounting aperture and the actuation member is moved to the second position.

18. The retainer of claim 13, wherein the actuation member is a handle.

19. The retainer of claim 13, wherein the mounting member comprises at least one of a bracket member and a washer.

20. An accessory retainer for a vehicle, where the vehicle includes a mounting aperture, the accessory retainer comprising:
   a shaft having a first end and a second end;
   a handle pivotally coupled to the shaft at the first end about a pivot axis, the handle including a cam surface positioned radially outwardly of the pivot axis;
   a retention member coupled to the shaft at the second end;
   a retainer member positioned intermediate the handle and the retention member; and
   a mounting member positioned intermediate the retainer member and the handle and adapted to retain an accessory to the mounting aperture, the shaft extending through the mounting member;
   wherein, when the handle is rotated, the cam surface cooperates with the mounting member and the retention member is pulled upwardly, causing engagement of the retainer member against the mounting aperture.

21. The accessory retainer of claim 20, wherein the retainer member is compressible and radially expands when the handle is moved from a first position to a second position.

22. The accessory retainer of claim 20, wherein the handle is pivotally coupled to the shaft, the handle pivotally rotatable between a first position and a second position, the first position being an open position, and the second position being a closed position.

23. The accessory retainer of claim 20, wherein the mounting member comprises at least one of a bracket member and a washer.

24. The accessory retainer of claim 20, wherein the first end of the shaft is positioned on one side of the mounting member, and the second end of the shaft is positioned on another side of the mounting member.

25. The accessory retainer of claim 20, wherein the retention member comprises a fastener.

26. The accessory retainer of claim 20, wherein the retainer member comprises a grommet.

27. An accessory assembly for a vehicle, where the vehicle includes a mounting aperture, the accessory assembly comprising:
   an accessory retainer, comprising:
   a shaft having a first end and a second end;
   a handle pivotally coupled to the shaft at the first end about a pivot axis, the handle including a cam surface positioned radially outwardly of the pivot axis;
   a retention member coupled to the shaft at the second end;
   a retainer member positioned intermediate the handle and the retention member; and
   a mounting member positioned intermediate the retainer member and the handle and, the shaft coupled to the mounting member; and
   an accessory coupled to the mounting member;
   wherein, when the accessory is placed adjacent to the vehicle with the retainer member in the mounting aperture, the handle is rotated and the cam surface cooperates with the mounting member, and the retention member is pulled upwardly, causing engagement of the retainer member against the mounting aperture securing the accessory to the vehicle.

28. An accessory assembly of claim 27, wherein the accessory is a storage rack.

* * * * *